(12) United States Patent
Lee et al.

(10) Patent No.: US 10,477,506 B2
(45) Date of Patent: Nov. 12, 2019

(54) ELECTRONIC DEVICE AND METHOD FOR DETERMINING POSITION

(71) Applicant: SAMSUNG ELECTRONICS CO., LTD., Suwon-si, Gyeonggi-do (KR)

(72) Inventors: Youngpo Lee, Seoul (KR); Jinwoo Kim, Seoul (KR); Sung Rae Cho, Yongin-si (KR); Chai-Man Lim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/696,560

(22) Filed: Sep. 6, 2017

(65) Prior Publication Data
US 2018/0077671 A1 Mar. 15, 2018

(30) Foreign Application Priority Data
Sep. 9, 2016 (KR) .................. 10-2016-0116336

(51) Int. Cl.
*H04W 64/00* (2009.01)
*H04W 8/02* (2009.01)
(Continued)

(52) U.S. Cl.
CPC ............. *H04W 64/00* (2013.01); *H04W 8/02* (2013.01); *H04W 64/006* (2013.01);
(Continued)

(58) Field of Classification Search
CPC ....... H04W 4/021; H04W 4/02; H04W 64/00; H04W 84/12; H04W 4/028; H04W 4/027; H04W 52/0251; H04W 4/008; H04W 4/022; H04W 4/04; H04W 88/02; H04W 4/023; H04W 84/042; H04W 4/025; H04W 64/003
See application file for complete search history.

(56) References Cited

U.S. PATENT DOCUMENTS 8,447,326 B2 5/2013 Huang et al.
8,750,895 B2 6/2014 Grosman et al.
(Continued)

FOREIGN PATENT DOCUMENTS

EP 2 987 352 A1 6/2014
JP 2011-071599 4/2011
(Continued)

OTHER PUBLICATIONS

D. Namiot and M. Sneps-Sneppe., "Geofence and Network Proximity", Aug. 28, 2013, 6 pages.
(Continued)

*Primary Examiner* — Kwasi Karikari
(74) *Attorney, Agent, or Firm* — Nixon & Vanderhye P.C.

(57) ABSTRACT

An electronic device may comprise a communication interface and a processor configured to control the communication interface to receive cellular data from at least one cellular base station, to predict a position of the electronic device based on the received cellular data, to receive information about at least one wireless LAN base station, and to determine the position of the electronic device based information about the at least one wireless LAN base station and the predicted position.

20 Claims, 13 Drawing Sheets

(51) Int. Cl.
   *H04W 84/12* (2009.01)
   *H04W 88/08* (2009.01)
   *G01S 5/02* (2010.01)

(52) U.S. Cl.
   CPC ........... *G01S 5/0252* (2013.01); *H04W 84/12* (2013.01); *H04W 88/08* (2013.01)

(56) References Cited

U.S. PATENT DOCUMENTS

| | | |
|---|---|---|
| 2004/0152472 A1 | 8/2004 | Ono et al. |
| 2005/0037775 A1 | 2/2005 | Moeglein et al. |
| 2009/0160711 A1* | 6/2009 | Mehta ................ G01S 5/0205 342/450 |
| 2013/0059602 A1 | 3/2013 | Cho et al. |
| 2014/0128093 A1 | 5/2014 | Das et al. |
| 2014/0258201 A1* | 9/2014 | Finlow-Bates ......... G01S 19/42 706/46 |
| 2015/0350825 A1* | 12/2015 | Kim ....................... H04W 4/02 455/456.1 |
| 2017/0280415 A1 | 9/2017 | Kim et al. |

FOREIGN PATENT DOCUMENTS

| | | |
|---|---|---|
| WO | 2005/004527 | 1/2005 |
| WO | WO 2007/056738 | 5/2007 |
| WO | WO 2014/169343 | 10/2014 |
| WO | WO 2015-027118 | 2/2015 |
| WO | 2016/024831 | 2/2016 |

OTHER PUBLICATIONS

International Search Report dated Nov. 29, 2017 in counterpart International Patent Application No. PCT/KR/2017/009938.
Extended European Search Report for dated May 24, 2019 for EP Application No. 17849151.0.

* cited by examiner

ELECTRONIC DEVICE AND METHOD FOR DETERMINING POSITION

CROSS-REFERENCE TO RELATED APPLICATION

This application is based on and claims priority under 35 U.S.C. § 119 to a Korean patent application filed in the Korean Intellectual Property Office on Sep. 9, 2016 and assigned Serial No. 10-2016-0116336, the disclosure of which is incorporated by reference herein in its entirety.

TECHNICAL FIELD

The present disclosure relates generally to electronic devices and methods for determining positions.

DISCUSSION OF RELATED ART

The development of mobile communication technology has been affording electronic devices various data communication functions as well as voice call. An electronic device may provide various functions according to the execution of an application obtained through a wired/wireless network. For example, an electronic device may provide location-based services using an application that utilizes location information about the electronic device.

The above information is presented as background information only to assist with an understanding of the present disclosure.

In determining the position of an electronic device, the electronic device may determine the position through a global positioning satellite (GPS) module. Where the electronic device determines its position through the GPS module, the GPS module needs to continue the operation of discovering satellites, causing increased power consumption. Further, positioning using cellular or Wireless LAN data alone may not be efficient from a point of view of power consumption. The electronic device may separately store a whole cellular map or Wireless LAN map. For example, where the electronic device runs out of its storage, a separate server may determine the position of the electronic device.

A need may exist for obtaining the exact and/or more precise position of the electronic device as well as increasing the efficiency of power consumption and management of the cellular database or Wireless LAN database.

SUMMARY

According to an example embodiment of the present disclosure, an electronic device may comprise a communication interface and a processor configured to control the communication interface to receive cellular data from at least one cellular base station, to predict a position of the electronic device based on the received cellular data, and to determine the position of the electronic device based on information about at least one wireless LAN base station and the predicted position.

According to an example embodiment of the present disclosure, a method for determining a position by an electronic device may comprise receiving cellular data from at least one cellular base station, predicting a position of the electronic device based on the received cellular data, receiving information about at least one wireless LAN base station, and determining the position of the electronic device based on the received information about the at least one wireless LAN base station and the predicted position.

According to an example embodiment of the present disclosure, a non-transitory computer-readable storage medium storing a program including a command to determine a position by an electronic device including a communication interface and a processor may comprise a first command set for receiving cellular data from at least one cellular base station, a second command set for predicting a position of the electronic device based on the received cellular data, a third command set for receiving information about at least one wireless LAN base station, and a fourth command set for determining the position of the electronic device based on the received information about the at least one wireless LAN base station and the predicted position.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
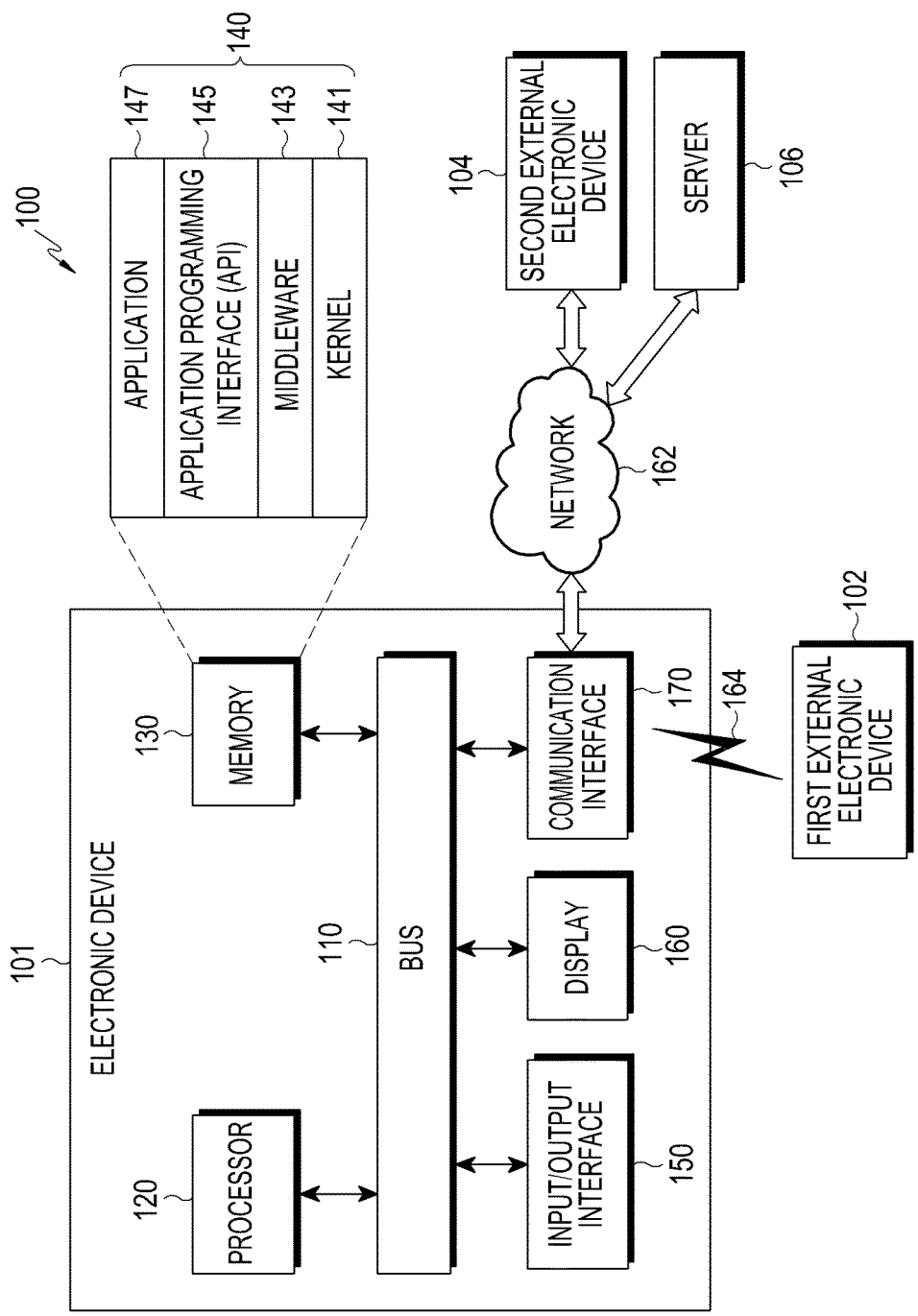
FIG. 1 is a diagram illustrating an example electronic device in a network environment according to an example embodiment.

Hereinafter, various example embodiments of the present disclosure are described with reference to the accompanying drawings. However, it should be appreciated that the present disclosure is not limited to the example embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. On the other hand, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may refer to a situation in which a device can perform an operation together with another device or parts. For example, the term "processor configured (or set) to perform A, B, and C" may refer, for example, and without limitation, to a generic-purpose processor (e.g., a CPU or application processor) that may perform the operations by executing one or more software programs stored in a memory device or a dedicated processor (e.g., an embedded processor) for performing the operations, or the like.

The terms as used herein are provided merely to describe various embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, even where the terms are defined herein they should not be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device, or the like, but is not limited thereto. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit), or the like, but is not limited thereto.

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame, or the like, but is not limited thereto.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler), or the like, but is not limited thereto.

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves), or the like, but is not limited thereto. According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a diagram illustrating an example electronic device 101 in a network environment 100 according to an example embodiment.

The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include various processing circuitry, such as, for example, and without limitation, one or more of a dedicated processor, a central processing unit (CPU), an application processor (AP), or a communication processor (CP). The components may be configured in a single system-on-chip (SoC) or in two or more separate processors. The processor 120 may perform control on at least one of the other components of the electronic device 101, and/or perform an operation or data processing relating to communication.

The memory 130 may include a volatile and/or nonvolatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may include various input/output circuitry and serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may include various communication circuitry to set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may use at least one of, e.g., long term evolution (LTE), long term evolution- advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
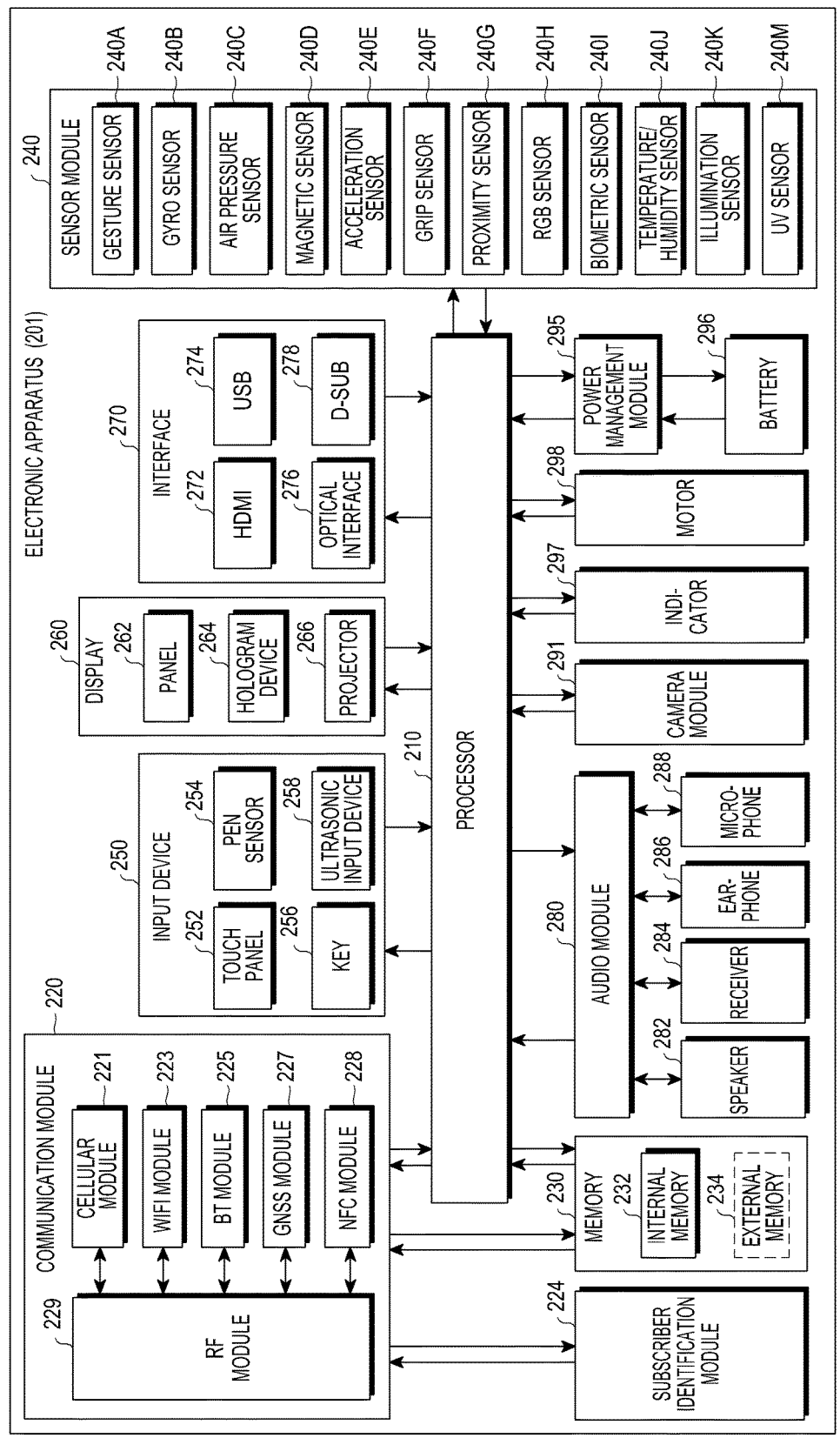
FIG. 2 is a block diagram illustrating an example electronic device according to an example embodiment of the present disclosure.

FIG. 2 is a block diagram illustrating an example electronic device 201 according to an example embodiment of the present disclosure.

The electronic device 201 may include the whole or part of the configuration of, e.g., the electronic device 101 illustrated in FIG. 1. The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface 270, an audio module 280, a camera module 291, a power management module 295, a battery 296, an indicator 297, and a motor 298.

The processor 210 may include various processing circuitry and control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include various communication circuitry, such as, for example, and without limitation, at least one of a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GNSS module 227, or the NFC module 228 may include a process for, e.g., processing data communicated through the module. According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally and/or physically connected with the electronic device 201 via various interfaces.

For example, the sensor module 240 may measure a physical quantity or detect an motion state of the electronic device 201, and the sensor module 240 may convert the measured or detected information into an electrical signal. The sensor module 240 may include at least one of, e.g., a gesture sensor 240A, a gyro sensor 240B, an atmospheric (e.g., air) pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include various input circuitry, such as, for example, and without limitation, at least one of a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include various interface circuitry, such as, for example, and without limitation, at least one of a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 295 may manage power of the electronic device 201, for example. The electronic device 201 may be an electronic device powered by a battery, but is not limited thereto. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
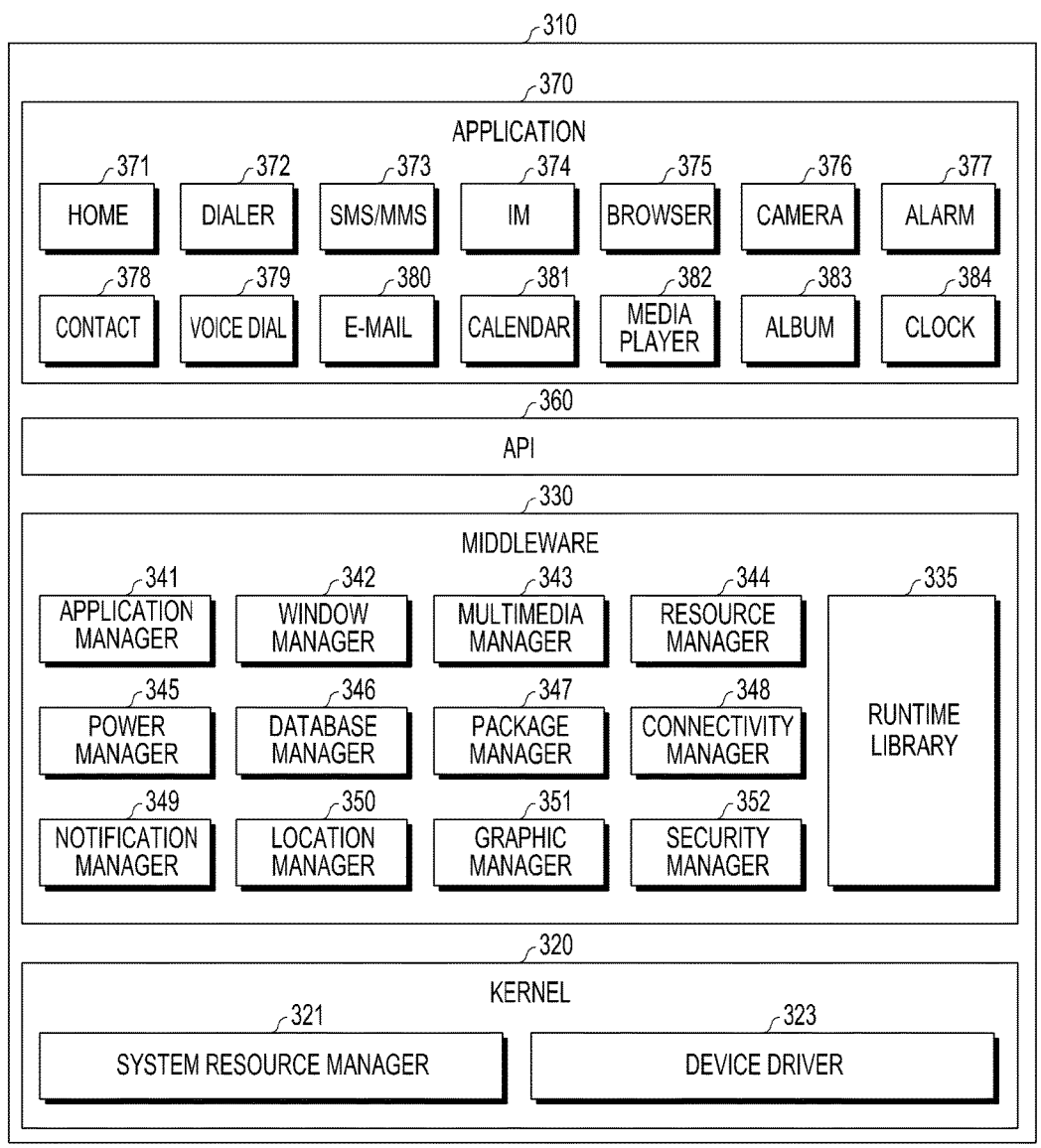
FIG. 3 is a block diagram illustrating an example program module according to an example embodiment of the present disclosure.

FIG. 3 is a block diagram illustrating an example program module according to an example embodiment of the present disclosure.

According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Samsung Bada OS™.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384. Additionally, or alternatively, although not shown, the application 370 may include, for example, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of commands, process, or the like for performing one or more functions.

Figure 4:
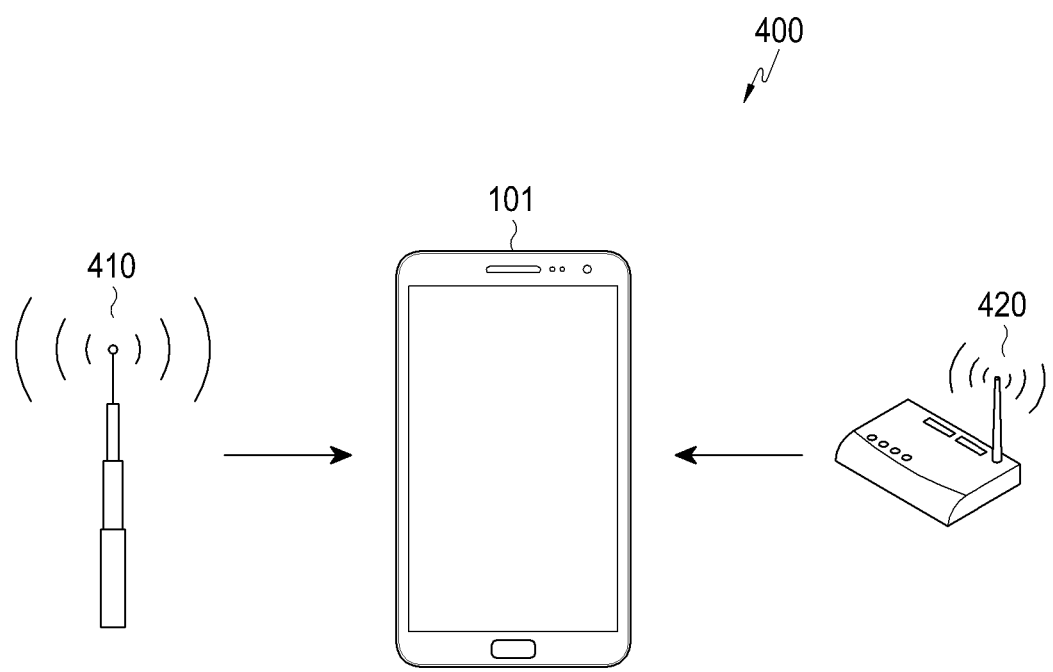
FIG. 4 is a diagram illustrating an example of a system for determining a position of an electronic device according to an example embodiment.

FIG. 4 is a diagram illustrating an example of a system for determining a position of an electronic device according to an example embodiment.

Referring to FIG. 4, according to an example embodiment of the present disclosure, a system 400 for determining a position of an electronic device may include an electronic device 101, a cellular base station 410, and a Wireless LAN base station 420. Although FIG. 4 illustrates a single cellular base station 410 and a single Wireless LAN base station 420, this is merely an example. The system of the present disclosure may include a plurality of cellular base stations and a plurality of Wireless LAN base stations. The cellular base station 410 or the Wireless LAN base station 420 may be the second external electronic device 104 or the server 106 of FIG. 1.

According to an example embodiment of the present disclosure, the electronic device 101 may receive cellular data from the cellular base station 410. The electronic device 101 may generate location information based on cellular data at a current position, e.g., a position at which location information has been obtained. For example, the GNSS module 227 (e.g., a GPS module) of the electronic device 101 may obtain location information, and the processor 120 of the electronic device 101 may obtain cellular data through the cellular module 221 of the electronic device 101. The electronic device 101 may generate location information for the current position by, for example, matching the obtained location information to cellular information according to the obtained cellular data. When the position of the electronic device 101 is changed, the electronic device 101 may obtain cellular data at the changed position. The electronic device 101 may generate location information at the new position using the obtained cellular data. The electronic device 101 may generate data containing location information at, at least one, geographical position collected, and the electronic device 101 may transmit the generated data to a server 106 (e.g., a location server). Here, the location information is information indicating the geographical position of the electronic device 101, and the location information may be, e.g., information related to a position transmitted from a GPS satellite that sends out location information. According to an embodiment of the present disclosure, the location information may include at least one of latitude information, longitude information, and position error information about the electronic device that is estimated using time information or a satellite signal received from the GPS satellite. The server 106 may store at least one cellular database and at least one Wireless LAN database. The server 106 may communicate with the electronic device 101 wirelessly or over a wired communication connection.

According to an embodiment of the present disclosure, the cellular data may include cellular data communicated between the electronic device 101 and the cellular base station 410 and data related to information about the cellular base station 410. The cellular data may include information about a serving cell and each neighbor cell. For example, the serving cell information may include a serving cell identifier and serving cell link information. The serving cell identifier may be information assigned to each cell by the network to differentiate the serving cell. For example, the serving cell identifier may include a cell identity (ID) and bandwidth information. The serving cell link information may include an instantaneous characteristic of a wireless link between the serving cell and the electronic device 101. For example, the serving cell link information may include a received signal strength and a timing advance. The neighbor cell information may include a neighbor cell identifier and neighbor cell link information. The neighbor cell identifier may include only part of the information contained in the serving cell identifier. The neighbor cell link information may include only part of the serving cell link information.

According to an example embodiment, the cellular data may include information about, for example, and without limitation, at least one of a received signal strength indicator (RSSI), a reference signal received power (RSRP), a reference signal received quality (RSRQ), a signal to noise ratio (SNR), and a time advance (TA). Cellular information according to the obtained cellular data may also be referred, for example, to as a cell measurement. The cellular information may include base station information. The base station information may include, for example, and without limitation, information about at least one of a country code, a network code, an area code, a frequency channel number, base station unique information, and physical base station unique information. Accordingly, the cellular information may include, for example, and without limitation, information about at least one of a mobile county code (MCC), a mobile network code (MNC), a tracking area code (TAC)/location area code (LAC), a frequency channel number (e.g., evolved-UTRA absolute radio frequency number (EARFCN)/absolute radio frequency channel number (ARFCN)), a cell ID (e.g., extended channel ID (ECI)), and a physical cell ID (e.g., physical cell ID (PCI)/primary scrambling code (PSC)).

According to an example embodiment of the present disclosure, the electronic device 101 may obtain cellular data not only from one cellular base station but also from each of a plurality of cellular base stations. For example, the electronic device 101 may communicate with each of a plurality of cellular base stations to obtain cellular data from each of the plurality of cellular base stations. According to an embodiment of the present disclosure, the electronic device 101 may obtain cellular data from the serving cell and cellular data from a neighbor cell. According to an embodiment of the present disclosure, the electronic device 101 may generate position collection information by matching the cellular data received from each of the serving cell and the neighbor cell to the location information. Accordingly, the location information may include the cellular data about each of the serving cell and the neighbor cell at the current position of the electronic device 101.

According to an example embodiment of the present disclosure, the electronic device 101 may obtain information from at least one Wireless LAN base station through, for example, the Wi-Fi module 223 and the BT module 225 of the electronic device 101. The electronic device 101 may generate location information about the electronic device 101 by matching the Wireless LAN information to cellular information according to the obtained cellular data. When the cellular data and the Wireless LAN data are simultaneously obtained, the electronic device 101 might not include latitude and longitude information using, e.g., a GPS satellite signal. When the position of the electronic device 101 is changed, the electronic device 101 may obtain cellular data and Wireless LAN data at the changed position and generate location information at the new position. The electronic device 101 may generate data containing location information at, at least one, geographical position collected, and the electronic device 101 may transmit the generated data to the server 106. The information received from the at least one Wireless LAN base station may include, for example, and without limitation, an identifier of the Wireless LAN base station.

According to an example embodiment of the present disclosure, the electronic device 101 may obtain information (e.g., Wireless LAN data) not only from one Wireless LAN base station but also from each of a plurality of Wireless LAN base stations. For example, the electronic device 101 may obtain information about at least one Wireless LAN base station by scanning the surroundings. The electronic device 101 may receive an identifier from at least one Wireless LAN base station scanned.

According to an example embodiment of the present disclosure, the electronic device 101 may performing geo-fencing by stepwise using cellular data and Wireless LAN data. The cellular data may include a signal for a call and data transmission service, such as a second generation (2G), third generation (3G), or fourth generation (4G) service, or the like, and is not limited thereto. The Wireless LAN data may include a signal according to a wireless LAN (WLAN), e.g., Wi-Fi. According to an embodiment of the present disclosure, the electronic device 101 may include a first processor (e.g., an AP) supporting an application or its related function, a sensor hub for processing various sensors, and a GPS module for precise positioning. The electronic device 101 may also include a second processor (e.g., a CP) supporting functions related to cellular communication for processing cellular data and a Wi-Fi module supporting functions related to wireless LAN communication for processing wireless LAN data. According to an example embodiment of the present disclosure, the electronic device 101 is described below in greater detail with reference to FIG. 5.

Figure 5:
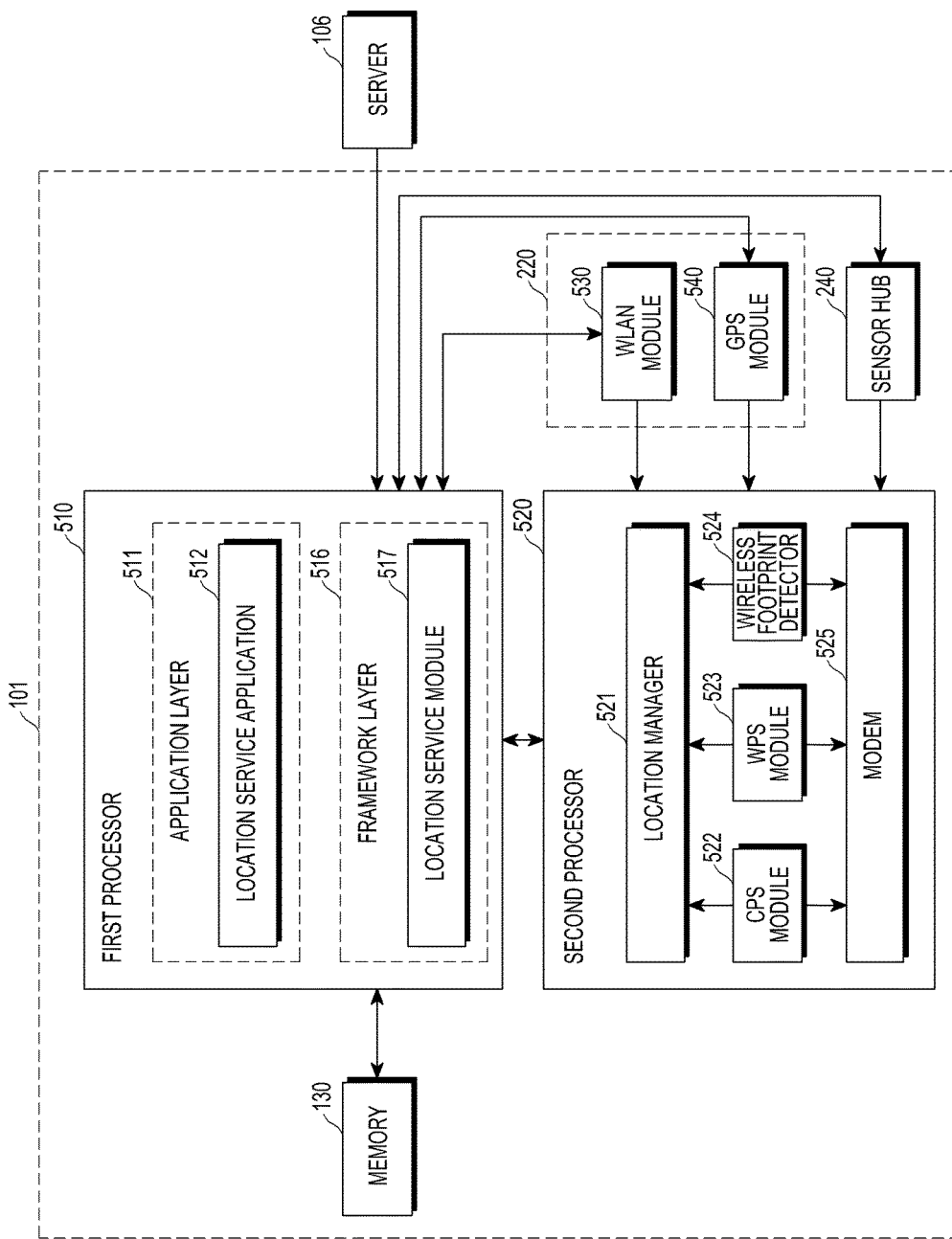
FIG. 5 is a block diagram illustrating an example electronic device that determines a position according to an example embodiment.

FIG. 5 is a block diagram illustrating an example electronic device that determines a position according to an example embodiment.

Referring to FIG. 5, according to an example embodiment of the present disclosure, an electronic device 101 for determining a position may include a first processor (e.g., including processing circuitry and/or program elements) 510 and a second processor (e.g., including processing circuitry and/or program elements) 520, a memory 130, and a communication module (e.g., including communication circuitry) 220.

According to an embodiment of the present disclosure, the electronic device 101 may include a first processor 510 (e.g., an AP), a second processor 520 (e.g., a CP), a memory 130, the communication module (e.g., including communication circuitry) 220, and a sensor hub 240. The first processor 510 may include an application layer 511 and a framework layer 516. The application layer 511 may include a location service application 512. The framework layer 516 may include a location service module 517. The second processor 520 may include a location manager 521, a cellular positioning system (CPS) module 522, a WLAN positioning system (WPS) module 523, a wireless footprint detector 524, and a modem 525. The first processor 510 may include the processor 120 and the memory 130. The second processor 520 may be the cellular module 221 of FIG. 2 and may include a CP (not shown) and an internal memory (not shown).

According to an embodiment of the present disclosure, the location service application 512 may send a request for geo-fencing to the location service module 517 of the framework layer 516. For example, the location service application 512 may send a request for registration or release of geo-fencing to the location service module 517. Upon receiving the request from the location service application 512, the location service module 517 may conduct at least one of detection of an entry into a geo-fence area (also referred to as "inbound detection"), detection of an exit from the geo-fence area (also referred to as "outbound detection"), or detection of the camping-on of the geo-fence area (also referred to as "dwelling detection") based on geo-fence information about a point of interest (POI) for a predetermined area. When such entry, exit, or camp-on is detected, the location service module 517 may deliver a geo-fencing notification message to the location service application 512. The detection of an entry may mean that the electronic device 101 (or the user carrying the electronic device 101) enters from the outside of the geo-fence to the inside (or is positioned inside the geo-fence) through cellular-based positioning or wireless LAN-based positioning. The detection of exit may mean that the electronic device 101 (or the user carrying the electronic device 101) exits from the inside of the geo-fence to the outside (or is absent inside the geo-fence) through cellular-based positioning or wireless LAN-based positioning. The detection of camp-on may mean that the electronic device 101 (or the user carrying the electronic device 101) stays inside the geo-fence for a predetermined time through cellular-based positioning or wireless LAN-based positioning. When the geo-fence service is not required any longer, the location service application 512 may deliver a request for releasing the geo-fencing for the POI to the location service module 517. Upon receiving the request for releasing the geo-fencing, the location service module 517 may abstain from carrying out the geo-fence operation.

According to an example embodiment of the present disclosure, the electronic device 101 may need at least one of the latitude of the POI, the longitude of the POI, the radius of the geo-fence from the POI, a geo-fencing mode (e.g., entry, exit, or camp-on), a camp-on reference time, POI geo-fence wireless footprint information, and other information in order to register geo-fencing. The electronic device 101 may obtain a single ID number per POI as a result of the geo-fencing registration.

According to an embodiment of the present disclosure, the electronic device 101 may require the POI ID number assigned thereto when geo-fencing is registered in order to release the geo-fencing. The electronic device 101 may determine whether the release of geo-fence succeeds or fails (true/false) as a result of releasing the geo-fencing.

According to an embodiment of the present disclosure, the electronic device 101 may receive a geo-fencing notification. The geo-fencing notification may include at least one of a single ID number per POI and a geo-fencing mode (e.g., entry, exit, or camp-on).

According to an example embodiment of the present disclosure, the electronic device 101 may provide the geo-fencing registration, geo-fencing release, and geo-fencing notification to another application through software. The electronic device 101 may provide the geo-fencing registration, geo-fencing release, and the geo-fencing notification to the other application through an application programing interface (API).

According to an example embodiment of the present disclosure, the location service module 517 of the first processor 510 may provide an API for the geo-fencing registration, geo-fencing release, and geo-fencing notification to the location manager 521 of the second processor 520. The location service module 517 may be connected with the memory 130, the server 106, a wireless LAN module (e.g., the WLAN module 530), the GPS 540, the sensor hub 240, or other modules.

According to an embodiment of the present disclosure, the geo-fencing operation and various calculations and determinations for the geo-fencing operation may be carried out by the location manager 521 of the second processor 520.

According to an embodiment of the present disclosure, when the first processor 510 is being operated for another service, or when it is not efficient for the first processor 510 to perform the various calculations or determinations for the geo-fencing operation, an operation related to at least one of the geo-fencing registration, the geo-fencing release, and the geo-fencing notification and/or the various calculations and determinations may be carried out by the location manager 521. The various calculations and determinations may be at least one of operations that are performed as below.

According to an example embodiment of the present disclosure, the second processor 520 may include the location manager 521 that manages and determines a geo-fencing function, the modem 525 that processes cellular data, the CPS module 522 that performs positioning using cellular data, the WPS module 523 that performs positioning using a wireless LAN signal, and the wireless footprint detector 524 that performs footprint-based detection using cellular data and wireless LAN data. The second processor 520 may periodically wake up from a sleep state to establish a connection with 8 a cellular base station. The second processor 520 may perform cellular-based positioning at the awaken state. The electronic device 101 may position the electronic device 101 without additional power consumption based on the operation of periodically waking up. When the electronic device 101 performs cellular-based positioning, the cellular-based positioning may be relatively low in accuracy of positioning than wireless LAN-based positioning due to large service coverage of the cellular base station.

According to an embodiment of the present disclosure, the electronic device 101 may periodically perform cellular positioning-based geo-fencing at a low power state. The electronic device 101 may identify a proximity to a geo-fence of a predetermined area of a POI through the geo-fencing operation. When the electronic device 101 approaches the geo-fence, the electronic device 101 may perform wireless LAN-based geo-fencing for a more accurate geo-fencing operation.

According to an embodiment of the present disclosure, the memory 130 may at least partially store at least one cellular map and at least one wireless LAN map. The memory 130 may be divided into a memory (not shown) associated with the first processor 510 and a memory (not shown) associated with the second processor 520. Data may be received from the server 106 according to commands of the location service module 517 and the location manager 521, updating each of the maps. The wireless LAN map may be one that has been generated to be suited for an area by processing and deriving the wireless LAN base station database, rather than a mere subset of the overall wireless LAN database stored in the server 106.

At least one of the database for the at least one cellular base station and the database for the at least one wireless LAN base station, which are stored in the electronic device 101, may be at least part of the database stored in the server 106. The at least part of the database may be obtained based on cellular data that the electronic device 101 obtains and receives from the cellular base station 410 and the wireless LAN base station 420.

According to an embodiment of the present disclosure, the server 106 may retain and manage all of the databases for at least one cellular base station and at least one wireless LAN base station. The server 106 may deliver at least part of the databases for the at least one cellular base station and the at least one wireless LAN base station based on a request from the electronic device 101. The electronic device 101 may perform positioning using the at least part of the databases received from the server 106.

According to an embodiment of the present disclosure, the server 106 may deliver at least part of the database for at least one wireless LAN base station based on cellular data contained in the request from the electronic device 101. The electronic device 101 may perform wireless LAN-based positioning using the at least part of the database for the wireless LAN base station and the wireless LAN data obtained from the wireless LAN base station 420.

According to an embodiment of the present disclosure, the CPS module 522 of the second processor 520 may include various circuitry and/or program elements and perform positioning and tracing on the position of the electronic device 101 using the cellular data and reflecting the nature of the second processor periodically operating. For use of cellular network information in positioning the electronic device 101 at a greater accuracy, cellular-based positioning may be configured in such a manner as to estimate the position of the electronic device 101 using a map for at least one cellular base station. The cellular base station map may be derived and obtained from the cellular base station database that the server retains and manages. In cellular-based positioning, a cellular base station map for one service area (e.g., a cell) may include internal coverage that indicates a transmission point of the cell and coverage in which the cell is accessed to enable communication and outer coverage that indicates an area in which another cell is accessed to perform communication but a signal can be reached in such a degree that the signal can be measured by a neighbor base station. The electronic device 101 may obtain the maps for the base stations in each cell, forming an overall database for the cellular network. Further, the electronic device 101 may estimate its position using multiple transmission points that one cell has and a mobility-considered area. The cellular-based positioning may be performed by calculating (determining) an overlapping area of the inner coverage and outer coverage of the serving cell and each neighbor cell using the cellular base station map stored in the storage of the electronic device. The cellular-based positioning may also be performed by calculating the overlapping area further considering an area predicted by the nature of the movement of the electronic device, selecting a transmission point that allows for a higher chance of access to the cell with multiple transmission points, and moving the area. When a particular neighbor cell exhibits a larger signal strength, the cellular-based positioning may be performed by calculating the overlapping area including the outer coverage of the neighbor cell. The electronic device 101 may increase accuracy as compared with existing cellular-based positioning by estimating its position using the inner coverage and outer coverage based on information about a neighbor cell. When the electronic device 101 is determined to approach the geo-fence area through the above-described cellular-based positioning, the electronic device 101 may perform geo-fencing based on wireless LAN data.

According to an example embodiment of the present disclosure, an electronic device may comprise a communication interface and a processor configured to control the communication interface to receive cellular data from at least one cellular base station to predict a position of the electronic device based on the received cellular data, to receive wireless LAN information about at least one wireless LAN base station, and to determine the position of the electronic device based on information about at least one wireless LAN base station to the predicted position.

According to an example embodiment of the present disclosure, the electronic device may further comprise a memory configured to store at least one wireless LAN map, wherein the wireless LAN map may correspond to an area positioned based on the received cellular data.

According to an example embodiment of the present disclosure, the processor may be configured to predict a longitude and a latitude of the electronic device based on the received cellular data, determine a probability value using a probability density function of the predicted longitude and latitude, and determine whether the electronic device is present inside or outside a predetermined area by comparing the determined probability value with a first threshold.

According to an example embodiment of the present disclosure, the processor may be configured to determine that the electronic device is present inside the predetermined area when the determined probability value is greater than the first threshold and to determine that the electronic device is not present inside the predetermined area unless the determined probability value is greater than the first threshold.

According to an example embodiment of the present disclosure, when the determined probability value is greater than a second threshold set to be greater than the first threshold, as well as the first threshold, the electronic device may be configured to make the final determination that the electronic device is present inside the predetermined area and may be configured to not perform wireless LAN-based geo-fencing.

According to an example embodiment of the present disclosure, upon determining the position of the electronic device based on information about the at least one wireless LAN base station, the processor may be configured to obtain the information about the at least one wireless LAN base station by scanning surroundings of the electronic device and estimate the position of the electronic device by comparing wireless LAN base station information included in the wireless LAN map with the wireless LAN base station information obtained by the scanning.

According to an example embodiment of the present disclosure, the processor may be configured to determine a distance between a point of interest (POI) and the estimated position of the electronic device and determine whether the electronic device is present inside or outside the predetermined area by comparing the determined distance with a radius of the predetermined area.

According to an example embodiment of the present disclosure, the processor may be configured to determine that the electronic device is not present inside the predetermined area when the determined distance is larger than the radius and to determine that the electronic device is present inside the predetermined area unless the determine distance is larger than the radius.

According to an example embodiment of the present disclosure, the processor may be configured to, when the memory includes wireless footprint information, determine a ratio of the number of wireless LAN base stations included in the wireless footprint information of the scanned wireless LAN base stations to the total number of wireless LAN base stations included in the wireless footprint information and to reflect the determined ratio in determining the position of the electronic device.

According to an example embodiment of the present disclosure, the processor may be configured to, when the radius of the predetermined area is less than a third threshold, to compare the determined ratio with a fourth threshold to determine whether the electronic device is present inside the predetermined area.

According to an example embodiment of the present disclosure, the processor may be configured to, when the determined ratio is greater than the fourth threshold, determine that the electronic device is present inside the predetermined area and to reflect the determination in determining the position of the electronic device.

According to an example embodiment of the present disclosure, the processor may be configured to, when the determined ratio is not larger than the third threshold, determine that the electronic device is in the predetermined area and to reflect the determination in determining the position of the electronic device.

According to an example embodiment of the present disclosure, the cellular data may include a cellular signal communicated between the electronic device and the at least one cellular base station and data related to the cellular base station.

According to an example embodiment of the present disclosure, the information about the at least one wireless LAN base station may include an identifier of the wireless LAN base station.

Figure 6:
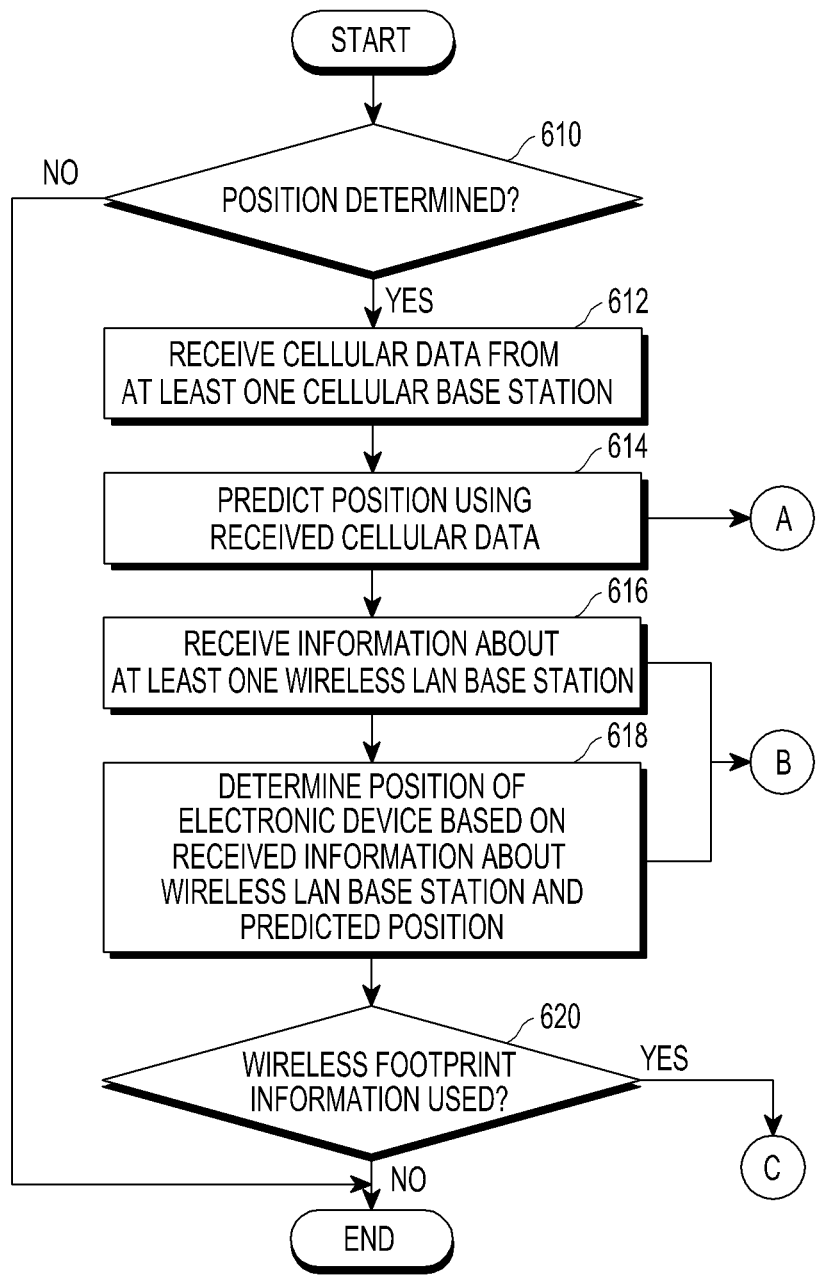
FIG. 6 is a flowchart illustrating an example process for determining a position of an electronic device according to an example embodiment.

FIG. 6 is a flowchart illustrating an example process for determining a position of an electronic device according to an example embodiment.

According to an example embodiment of the present disclosure, the electronic device 101 may determine a user's position in operation 610. The electronic device 101 may determine the user's current position to determine whether the user has approached a predetermined area, departed from the predetermined area, or stays in the predetermined area for a predetermined time. The electronic device 101 may determine whether the user enters/exits/camps on the geofence using cellular positioning-based geo-fencing and wireless LAN positioning-based geo-fencing. According to the present disclosure, determining the position may include the operation of detecting the entry/exit/camp-on in the geofence while observing the user's position.

According to an embodiment of the present disclosure, the electronic device 101 may receive cellular data from at least one cellular base station in operation 612. The electronic device 101 may receive cellular data from at least one of a cellular base station of a serving cell and a cellular base station of a neighbor cell. The electronic device 101 may receive information about at least one of an MCC, an MNC, a TAC, a cell ID, a PCI, an EARFCN, an RSSI, an RSRQ, an SNR, an RSRP, and a TA from the cellular base station of the serving cell. Or, the electronic device 101 may receive information about at least one of a PCI, an EARFCN, and an RSRP from the cellular base station of the neighbor cell. The electronic device 101 may predict the position of the electronic device 101 using the cellular data received from at least one cellular base station. The electronic device 101 may predict the current position of the electronic device 101 based on (or using) the received cellular data.

According to an embodiment of the present disclosure, the electronic device 101 may predict the position based on the received cellular data in operation 614. The electronic device 101 may predict the longitude and latitude of the electronic device 101 based on the received cellular data. The electronic device 101 may determine a probability value by applying the predicted longitude and latitude of the electronic device 101 to a probability density function. The electronic device 101 may probabilistically determine a cellular positioning-based geo-fencing event. The electronic device 101 may determine whether it enters, exits, or camps on a predetermined area (e.g., a geo-fence) using a probability density function which is a result of the cellular positioning. The geo-fencing event may include entry, exit, or camp-on in a point of interest (POI). The geo-fence indicates a virtual geographical boundary for the POI. The geo-fencing may be the process of monitoring a geographical area using the geo-fence. Upon determining that the geo-fencing event occurs, the electronic device 101 may determine whether wireless LAN-based geo-fencing is required. The electronic device 101 may identify whether a wireless LAN map is stored in the memory 130. Unless a wireless LAN map is stored in the memory 130, the electronic device 101 may obtain a wireless LAN map for a cellular positioning range from the server 106. When there are sufficiently many POIs as registered by the location service application 512, the electronic device 101 may raise discovery efficiency by configuring a list of adjacent POIs that are required to be discovered upon geo-fencing based on, e.g., the estimated position and cellular base station map structure. The electronic device 101 may determine whether the electronic device 101 is present inside or outside a predetermined area by comparing the determined probability value with a first threshold. When the determined probability value is larger than the first threshold, the electronic device 101 may determine that the electronic device is present inside the predetermined area. When the determined probability value is not larger than the first threshold, the electronic device 101 may determine that the electronic device 101 is not present inside the predetermined area. For example, since the inner coverage and outer coverage for a cell are sufficiently small in an area where cellular base stations are dense, such as a downtown, the area of interest for the POI may include the same. In such case, the determined probability value may be a significantly large value. When the determined probability value is greater than a second threshold, which is set to be larger than the first threshold, as well as larger than the first threshold, the electronic device 101 may abstain from wireless LAN-based geo-fencing, and the electronic device 101 may report a result of geo-fencing to the location service module 517.

According to an embodiment of the present disclosure, the electronic device 101 may receive information about at least one wireless LAN base station in operation 616. Upon determining that the geo-fencing event occurs, the electronic device 101 may determine whether wireless LAN-based geo-fencing is required. The electronic device 101 may identify whether a wireless LAN map is stored in the memory 130. For example, upon identifying that wireless LAN-based geo-fencing is required and that a wireless LAN map is stored in the memory 130, the electronic device 101 may determine a wireless LAN positioning-based geo-fencing event. The electronic device 101 may obtain information about at least one Wi-Fi base station by scanning the surroundings. The electronic device 101 may perform geo-fencing based on wireless LAN data received from the at least one wireless LAN base station. The electronic device 101 may scan at least one nearby wireless LAN base station through the WLAN module 530 and may obtain unique information (e.g., an identifier) about the at least one wireless LAN base station. Determining a necessity for wireless LAN scanning and wireless LAN-based positioning may follow the longitude and latitude probability value determined in the cellular-based positioning and may be determined by the first processor 510 or the second processor 520 of the electronic device 101 depending on implementations. Such request for wireless LAN scanning may be delivered through an interface directly connected between the first processor 510 and the WLAN module 530 or between the second processor 520 and the WLAN module 530. The interface may include, e.g., a universal asynchronous receiver/transmitter (UART), a qualcomm MSM interface (QMI), a serial peripheral interface (SPI), an I square C (I2C). The electronic device 101 may provide communication between all of the modules in the electronic device 101 and the second processor 520 through the interface. By such structure, not the first processor 510 but the second processor 520 may perform operations related to geo-fencing. The WLAN module 530 may scan wireless LAN base stations and transfer a result of the scanning to the second processor 520 through an interface directly connected. Accordingly, the electronic device 101 may perform geo-fencing through the second processor 520 at reduced power while excluding the operation of the first processor 510.

According to an embodiment of the present disclosure, the electronic device 101 may determine its position based on the received information about the wireless LAN base station and the predicted position in operation 618. After performing wireless LAN-based positioning, the electronic device 101 may perform a binary hypothesis test on whether the electronic device 101 is present in a predetermined area (e.g., a geo-fence), thereby determining the position of the electronic device. The electronic device 101 may obtain a wireless LAN map for the predetermined area from the server 106 and store the wireless LAN map in the memory 130. The wireless LAN map may be partitioned in a geographical grid pattern and store information about a wireless LAN base station present per grid cell. The wireless LAN map may be generated to be localized to a geographical area predicted from the cellular-based positioning. The generated wireless LAN map may be a wireless LAN map that has been generated to be suited for the area by processing and deriving the wireless LAN base station database, rather than a mere subset of the overall wireless LAN database stored in the server 106. The electronic device 101 may estimate its position by comparing wireless LAN base station information included in the wireless LAN map for at least one wireless LAN base station with wireless LAN base station information obtained by scanning its surroundings. The map may be stored in the memory 130 of the electronic device 101 based on the information received from the at least one wireless LAN base station. Specifically, the result of wireless LAN scanning may be compared with the wireless LAN map and analyzed, and the position of the electronic device 101 may be provided as the coordinates of one of the center points of the grid cells. Thereafter, the electronic device 101 may perform a wireless LAN-based geo-fencing operation by determining whether the coordinates as the result of positioning fall within the predetermined area. The electronic device 101 may calculate the distance between the POI and the estimated position of the electronic device and compare the calculated distance with the radius of a predetermined area of interest. The electronic device 101 may determine whether it is present inside or outside the predetermined area.

According to an embodiment of the present disclosure, the electronic device 101 may determine whether to use wireless footprint information about the POI in operation

620. When the wireless footprint information measured at the POI is stored in the memory 130, the electronic device 101 may reflect the wireless footprint information in determining the position of the electronic device 101. The electronic device 101 may use the wireless footprint information to more precisely determine the position of the electronic device 101. When the memory 130 stores the wireless footprint information, the electronic device 101 may calculate a ratio of the number of wireless LAN base stations included in the wireless footprint of the scanned wireless LAN base stations to the total number of wireless LAN base stations included in the wireless footprint. The electronic device 101 may reflect the calculated ratio in determining the position of the electronic device 101. For example, for the owners of shops that have difficulty in setting up a broad predetermined area (e.g., a geo-fence), the shop owners may register information about their owned wireless LAN base stations as a wireless footprint. In such case, the electronic device 101 may further perform detection-based geo-fencing by utilizing the base stations registered in the wireless footprint information as additional information. A detailed process for determining the position of the electronic device 101 using such wireless footprint information is described in greater detail below with reference to FIGS. 9 and 10. According to the present disclosure, the operations illustrated in FIG. 9 or the operations illustrated in FIG. 10 may be carried out in determining the position of the electronic device 101 using wireless footprint information. According to the present disclosure, the operations illustrated in FIGS. 9 and FIG. 10 may be carried out in determining the position of the electronic device 101 using wireless footprint information.

According to an example embodiment of the present disclosure, a method for determining a position by an electronic device may comprise receiving cellular data from at least one cellular base station, predicting a position of the electronic device based on the received cellular data, receiving information about at least one wireless LAN base station, and determining the position of the electronic device based on the received information about the at least one wireless LAN base station and the predicted position.

According to an example embodiment of the present disclosure, predicting the position of the electronic device may include predicting a longitude and a latitude of the electronic device based on the received cellular data, determining a probability value using a probability density function of the predicted longitude and latitude, and determining whether the electronic device is present inside or outside a predetermined area by comparing the determined probability value with a first threshold.

According to an example embodiment of the present disclosure, determining whether the electronic device is present inside or outside the predetermined area may include, when the determined probability value is greater than the first threshold, determining that the electronic device is present inside the predetermined area, and when the determined probability value is not greater than the first threshold, determining that the electronic device is not present inside the predetermined area.

According to an example embodiment of the present disclosure, determining the position of the electronic device may include determining whether to determine the position of the electronic device based on the information about the at least one wireless LAN base station, obtaining the information about the at least one wireless LAN base station by scanning surroundings of the electronic device, and estimating the position of the electronic device by comparing wireless LAN base station information included in a wireless LAN map stored in a memory of the electronic device with the wireless LAN base station information obtained by the scanning.

According to an example embodiment of the present disclosure, determining the position of the electronic device may include determining a distance between a POI and the estimated position of the electronic device and determining whether the electronic device is present inside or outside the predetermined area by comparing the determined distance with a radius of the predetermined area.

According to an example embodiment of the present disclosure, determining the position of the electronic device may include, when the determined distance is greater than the radius, determining that the electronic device is not present inside the predetermined area, and when the determined distance is not greater than the radius, determining that the electronic device is present inside the predetermined area.

According to an example embodiment of the present disclosure, determining the position of the electronic device may include, when the memory includes wireless footprint information, determining a ratio of the number of wireless LAN base stations included in the wireless footprint information of the scanned wireless LAN base stations to the total number of wireless LAN base stations included in the wireless footprint information and reflecting the determined ratio in determining the position of the electronic device.

According to an example embodiment of the present disclosure, determining the position of the electronic device may include, when the determined ratio is greater than the fourth threshold, determining that the electronic device is present inside the predetermined area and reflecting the determination in determining the position of the electronic device.

According to an example embodiment of the present disclosure, determining the position of the electronic device may include, when the determined ratio is not greater than the fourth threshold, determining that the electronic device is not present inside the predetermined area and reflecting the determination in determining the position of the electronic device.

Figure 7:
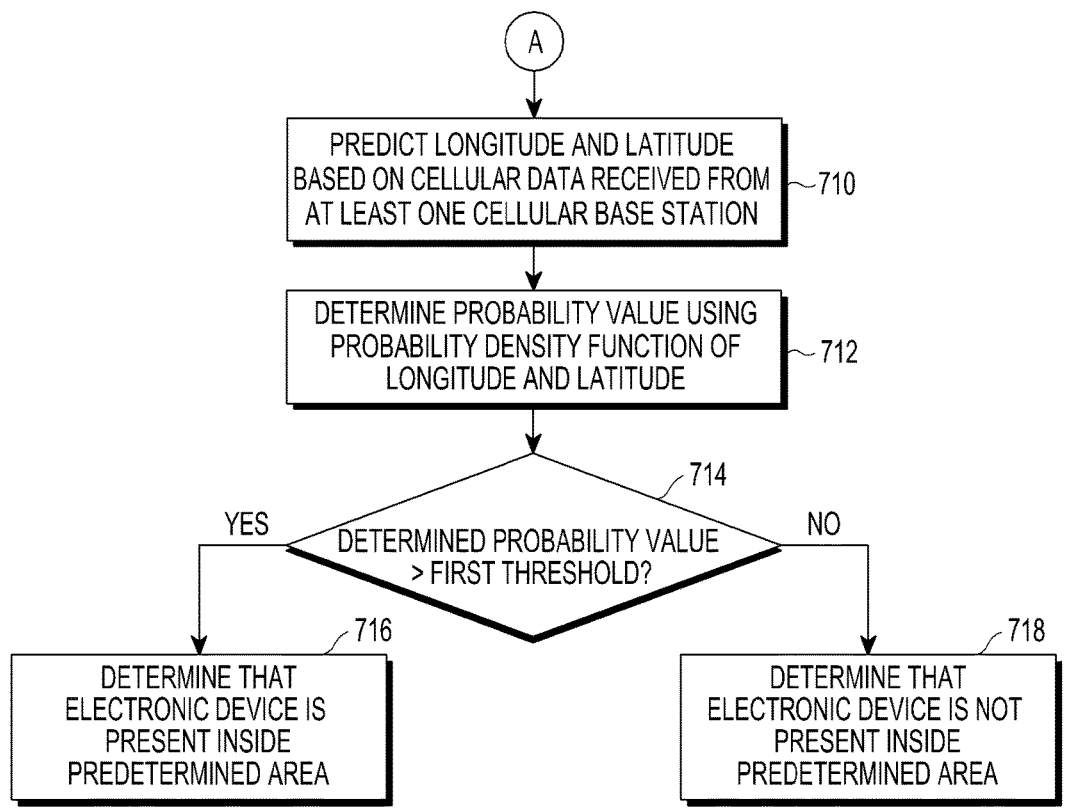
FIG. 7 is a flowchart illustrating an example process for predicting a position of an electronic device using cellular data received from at least one cellular base station according to an example embodiment.

FIG. 7 is a flowchart illustrating an example process for predicting a position of an electronic device using cellular data received from at least one cellular base station according to an example embodiment.

A process for predicting a position of an electronic device using cellular data received from at least one cellular base station according to an example embodiment is described below with reference to FIG. 7.

According to an embodiment of the present disclosure, the electronic device 101 may predict the position of the electronic device 101 using the cellular data received from at least one cellular base station in operation 710. The electronic device 101 may predict the longitude and latitude of the electronic device 101 based on the received cellular data and a cellular base station map.

According to an embodiment of the present disclosure, the electronic device 101 may determine a probability value using a probability density function of the predicted longitude and latitude in operation 712. The electronic device 101 may determine a probability value by applying the predicted longitude and latitude of the electronic device 101 to a probability density function. The electronic device 101 may determine whether it enters, exits, or camps on a predetermined area (e.g., a geo-fence) using a probability density function which is a result of the cellular positioning. The geo-fence may indicate a virtual geographical boundary for the POI. The geo-fencing may be the process of monitoring a geographical area using the geo-fence. The electronic device 101 may determine the probability value of the longitude and latitude of the electronic device 101 for the predetermined area using Equation 1 as follows:

$$P_G = \int_G f_{x,y}(X,Y)dXdY \qquad \text{Equation 1}$$

In Equation 1 above, X refers to the longitude of the electronic device 101, and Y refers to the latitude of the electronic device 101. G refers the area of the predetermined area (e.g., a geo-fence), and $P_G$ refers to the probability value. The electronic device 101 may determine whether it enters, exits, or camps on the predetermined area using the probability density function of longitude and latitude which is a result of the cellular positioning. Although a statistical detection scheme is described which applies the longitude and latitude of the electronic device 101 to a probability density function, embodiments of the present disclosure are not limited thereto.

According to an embodiment of the present disclosure, the electronic device 101 may compare the determined probability value with a predetermined threshold (e.g., the first threshold) in operation 714. The electronic device 101 may determine whether the electronic device 101 is present inside or outside a predetermined area by comparing the determined probability value with a first threshold.

According to an embodiment of the present disclosure, when the determined probability value is greater than the first threshold, the electronic device 101 may determine that the electronic device 101 is present inside the predetermined area in operation 716. According to an embodiment of the present disclosure, when the determined probability value is less than or equal the first threshold, the electronic device 101 may determine that the electronic device 101 is not present inside the predetermined area in operation 718. When the determined probability value is greater than a second threshold, which is set to be larger than the first threshold, as well as the first threshold, the electronic device 101 may abstain from wireless LAN-based geo-fencing, and the electronic device 101 may report a result of geo-fencing to the location service module 517. The electronic device 101 may determine whether the electronic device 101 is present inside or outside the predetermined area or camps on the predetermined area for a predetermined time by comparing the probability value determined through Equation 1 with a predetermined threshold as shown in Equation 2.

$$H: P_G \leq T_G$$

$$K: P_G > T_G \qquad \text{Equation 2}$$

In Equation 2 above, PG is the probability value calculated through Equation 1, may be used as a test statistic, and $T_G$ is the predetermined threshold (e.g., the first threshold). H represents the null hypothesis, meaning that the electronic device 101 is present outside the predetermined area. K represents the alternative hypothesis, meaning that the electronic device 101 is present inside the predetermined area. $T_G$ is the predetermined threshold which may be used to determine the entry, exit, or comp-on in the predetermined area. For example, entry into the predetermined area corresponds to where H-->K through periodic binary hypothesis tests. Exit from the predetermined area corresponds to where K-->H through periodic binary hypothesis tests. Camping on the predetermined area may be known by determining whether K is continuously maintained for a predetermined time ($T_D$).

According to an embodiment of the present disclosure, when the result of the cellular-based positioning is outputted as a second-order Gaussian probability density function, $f_{x,y}(X,Y)$, the probability density function may be put to use. Since X and Y are modeled as dependent probability variables and may thus have a correlation value, the second-order Gaussian probability density function may be defined in a form taking means E[X] and E[Y] and a covariance matrix of Equation 3 below as parameters.

$$\begin{bmatrix} \sigma_{X,X}^2 & \sigma_{X,Y}^2 \\ \sigma_{Y,X}^2 & \sigma_{Y,Y}^2 \end{bmatrix} \qquad \text{[Equation 3]}$$

In Equation 3 above, $\sigma_{A,B}^2$ is defined as $\sigma_{A,B}^2 = E[(A-E[A])(B-E[B])]$, E[A] denotes the expected value of A. As such, the result of the cellular positioning may be output as the second-order Gaussian probability density function, $f_{x,y}(X,Y)$, and may be integrated through the geographical area. When the predetermined area (e.g., a geo-fence) is expressed with the coordinates and radius of the predetermined area, the surface integral may be conducted on the predetermined area for the probability density function. By comparing the determined test statistic $P_G$ with the predetermined threshold $T_G$, the electronic device 101 may determine whether the electronic device 101 is present inside or outside the predetermined area. By periodically making such determination, the electronic device 101 may determine whether the electronic device 101 enters, exits, or camps on the predetermined area.

As such, cellular positioning, although achievable at reduced power, may suffer from a low accuracy. Further, raising the predetermined threshold $T_G$ may lower detection probability. The electronic device 101 may determine whether the electronic device 101 approaches the predetermined area and determine and determine an entry or exit event through cellular positioning by setting the predetermined threshold $T_G$ not to be high. The electronic device 101 may perform a more accurate geo-fencing operation using wireless LAN data. As such, threshold $T_G$ may not be set to be high and used as the above-described first threshold, and as described above, the determined probability value may be a significantly large value. When the calculated probability value is larger than the second threshold, which is set to be larger than the first threshold, the electronic device 101 may abstain from wireless LAN-based geo-fencing, and the electronic device 101 may report a result of geo-fencing to the location service module 517.

Figure 8:
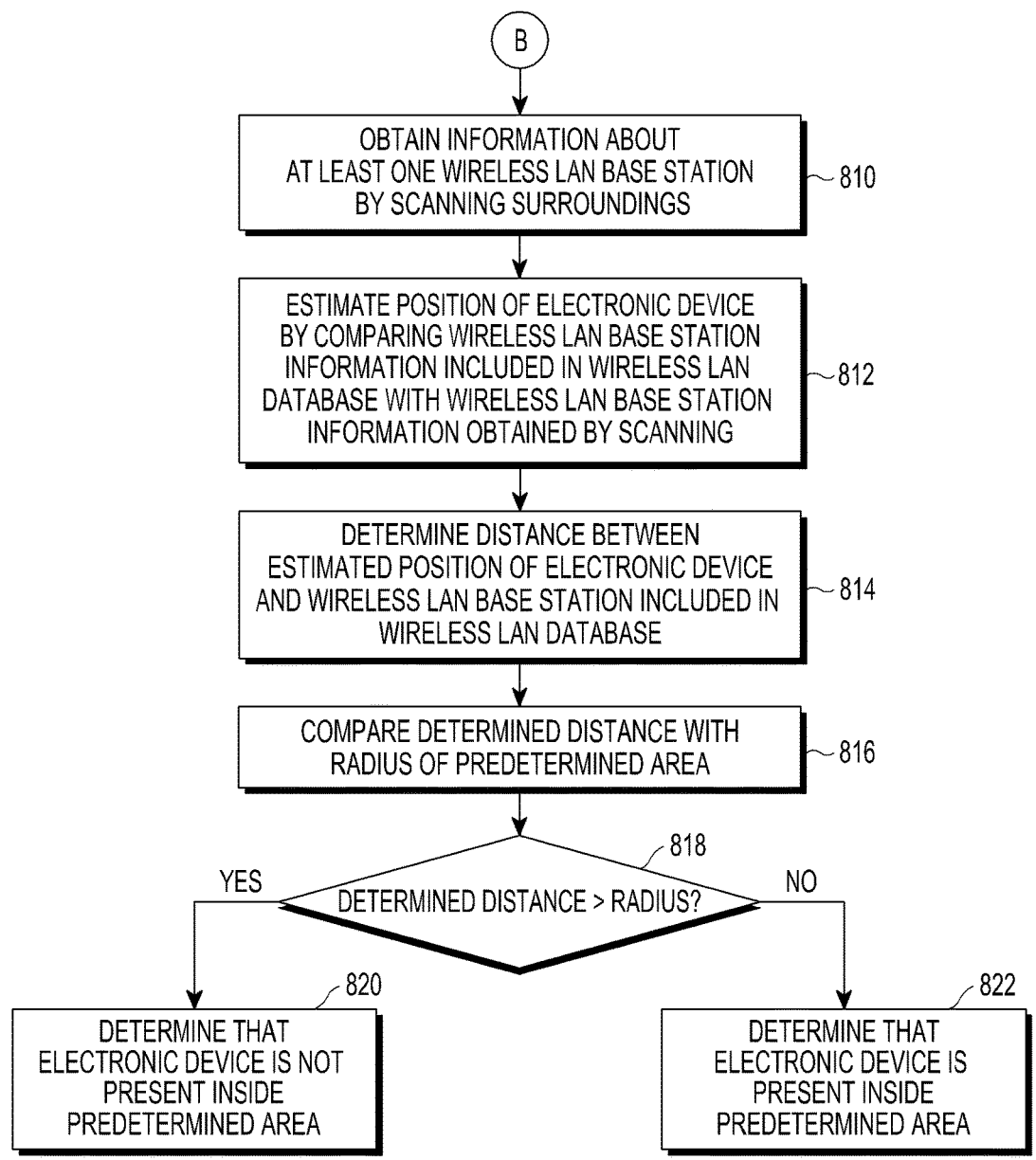
FIG. 8 is a flowchart illustrating an example process for determining a position of an electronic device by reflecting information received from at least one Wireless LAN base station according to an example embodiment.

FIG. 8 is a flowchart illustrating an example process for determining a position of an electronic device based on information received from at least one Wireless LAN base station according to an example embodiment.

A process for predicting a position of an electronic device based on information received from at least one wireless LAN base station according to an example embodiment is described below with reference to FIG. 8.

According to an embodiment of the present disclosure, in operation 810, the electronic device 101 may obtain information about at least one wireless LAN base station by scanning its surroundings to determine the position of the electronic device 101 by reflecting information about a wireless LAN base station to the position of the electronic device predicted in operation 614 of FIG. 6. Upon determining that the geo-fencing event occurs, the electronic device 101 may determine whether wireless LAN-based geo-fencing is required. The electronic device 101 may identify whether a wireless LAN map is stored in the memory 130. Unless a wireless LAN map is stored in the memory 130, the electronic device 101 may obtain a wireless LAN map for a cellular positioning range from the server 106 and reflect the same in determining the position of the electronic device 101. The 101 may receive information about at least one wireless LAN base station from the server 106. The electronic device 101 may obtain information about at least one Wi-Fi base station by scanning the surroundings. The electronic device 101 may perform geo-fencing based on wireless LAN data received from the at least one wireless LAN base station. The electronic device 101 may scan at least one nearby wireless LAN base station through the WLAN module 530 and may obtain unique information (e.g., an identifier) about the at least one wireless LAN base station. Such need or not for wireless LAN scanning may be determined by the first processor 510 or the second processor 520 of the electronic device 101. When the second processor 520 performs wireless LAN-based positioning, the request for wireless LAN scanning may be delivered through an interface directly connected between the second processor 520 and the WLAN module 530. The WLAN module 530 may scan wireless LAN base stations and transfer a result of the scanning to the second processor 520 through an interface directly connected. Accordingly, the electronic device 101 may perform geo-fencing through the second processor 520 at reduced power while excluding the operation of the first processor 510.

According to an embodiment of the present disclosure, in operation 812, the electronic device 101 may estimate its position by comparing the wireless LAN base station information included in the wireless LAN map with the wireless LAN base station information obtained by scanning in operation 810. After performing wireless LAN-based positioning, the electronic device 101 may perform a binary hypothesis test on whether the electronic device 101 is present in a predetermined area (e.g., a geo-fence), thereby determining the position of the electronic device. The electronic device 101 may obtain a wireless LAN map for the predetermined area from the server 106 and store the wireless LAN map in the memory 130, e.g., wireless LAN database. The electronic device 101 may partition the wireless LAN map in a geographical grid pattern, and the electronic device 101 may process and store information about a wireless LAN base station present per grid cell. The electronic device 101 may estimate its position by comparing wireless LAN base station information included in at least one wireless LAN map with wireless LAN base station information obtained by scanning its surroundings. The second processor 520 of the electronic device 101 may compare the result of wireless LAN scanning with the wireless LAN map, analyze, and provide the position of the electronic device 101 as the coordinates of one of the center points of the grid cells. Thereafter, the electronic device 101 may perform a wireless LAN-based geo-fencing operation by determining whether the coordinates as the result of positioning fall within the predetermined area.

According to an embodiment of the present disclosure, in operation 814, the electronic device 101 may determine the distance between the POI with the estimated position of the electronic device. The electronic device 101 may determine the distance between the POI and the estimated position of the electronic device and compare the determined distance with the radius of a predetermined area. The electronic device 101 may determine whether the electronic device 101 is present inside or outside the predetermined area. The electronic device 101 may calculate the distance between the POI and the estimated position of the electronic device through Equation 4 as follows:

$$R = \sqrt{(lat_{poi} - lat_{wps})^2 + (lon_{poi} - lon_{wps})^2}$$ [Equation 4]

In Equation 4 above, the coordinates of the electronic device are expressed as $(lat_{wps}, lon_{wps})$, and the coordinates of the center of the predetermined area are expressed as $(lat_{poi}, lon_{poi})$. R refers to the distance between the coordinates of the center of the predetermined area and the estimated position of the electronic device 101.

According to an embodiment of the present disclosure, in operation 816, the electronic device 101 may compare the determined distance with the radius of the predetermined area. The electronic device 101 may make such comparison by applying the distance R calculated through Equation 4 to the binary hypothesis.

H:R>r

K:R≤r  Equation 5

H represents the null hypothesis, meaning that the electronic device 101 is present outside the predetermined area. K represents the alternative hypothesis, meaning that the electronic device 101 is present inside the predetermined area. R refers to the distance between the wireless LAN base station and the estimated position of the electronic device, and r refers to the radius of the predetermined area.

According to an embodiment of the present disclosure, when the determined distance is greater than the radius, the electronic device 101 may determine that the electronic device 101 is present outside (e.g., not present inside the predetermined area) the predetermined area in operation 820. The electronic device 101 may determine its position based on information about the at least one wireless LAN base station to the predicted position using cellular data received from at least one cellular base station.

According to an embodiment of the present disclosure, unless the determined distance is greater than the radius, the electronic device 101 may determine that the electronic device 101 is present inside the predetermined area in operation 822.

Figure 9:
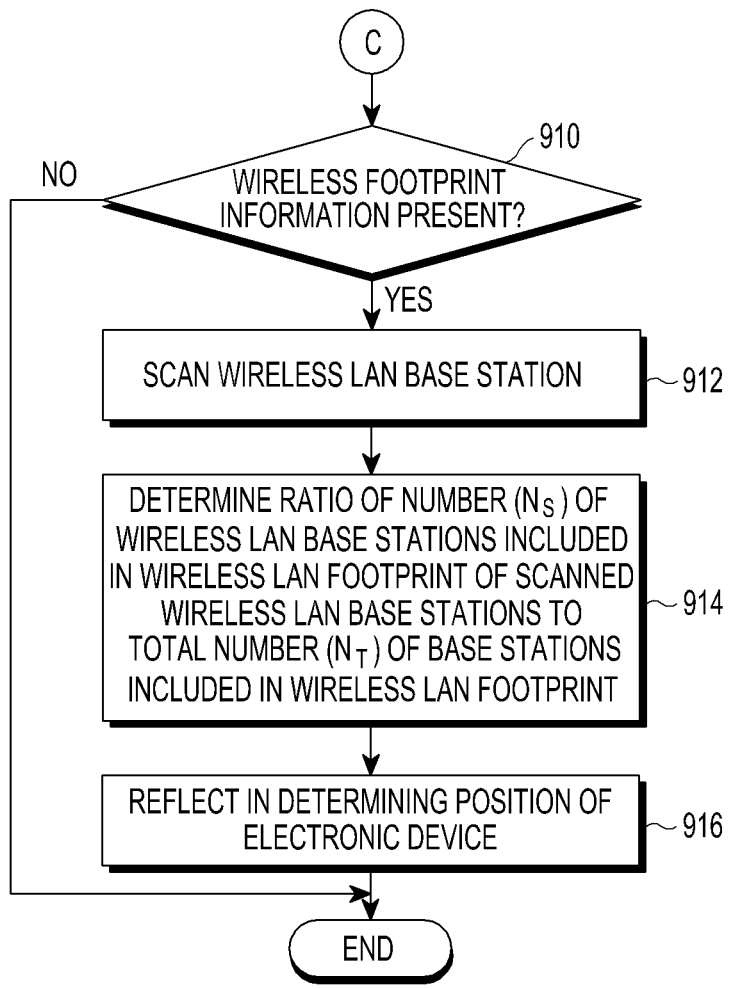
FIG. 9 is a flowchart illustrating an example process for determining a position of an electronic device when there is wireless footprint information according to an example embodiment.

FIG. 9 is a flowchart illustrating an example process for determining a position of an electronic device when there is wireless footprint information according to an example embodiment.

A process for determining a position of an electronic device when there is wireless footprint information according to an example embodiment is described below in greater detail with reference to FIG. 9.

According to an embodiment of the present disclosure, the electronic device 101 may determine whether wireless footprint information is stored in the memory 130 in operation 910. The wireless footprint information may be registered by the location service application 512 or the location service module 517, and the wireless footprint information may indicate wireless LAN data measured at a POI. The electronic device 101 may use the wireless footprint information to more precisely determine the position of the electronic device 101. Since wireless LAN positioning may estimate that the position of the electronic device 101 is the central point of the wireless LAN map, it may differ from the actual position of the electronic device 101. To compensate for such difference, wireless footprint information may be used. As such, optional use of the wireless footprint information leads to increased reliability in determining the position of the electronic device 101.

According to an embodiment of the present disclosure, the electronic device 101 may scan wireless LAN base stations in operation 912. The electronic device 101 may scan at least one base station that is positioned around the electronic device 101. The electronic device 101 may detect at least one base station by scanning its surroundings to enhance the reliability of positioning.

According to an embodiment of the present disclosure, in operation 914, the electronic device 101 may determine a ratio Ns/NT of the number Ns of wireless LAN base stations included in the wireless footprint information among the scanned wireless LAN base stations to the total number NT of wireless LAN base stations included in the wireless footprint information. In order to more precisely determine the position of the electronic device 101, the electronic device 101 may reflect the determined ratio Ns/NT in determining the position of the electronic device 101 that has been determined in operation 618 of FIG. 6. For example, for the owners of shops that have difficulty in setting up a broad predetermined area (e.g., a geo-fence), it may be efficient to register the wireless LAN base station information owned by the shop owners as wireless footprint information and to start a certain service when the electronic device 101 detects the same. In such case, the electronic device 101 may further perform detection-based geo-fencing by utilizing the base stations registered in the wireless footprint information as additional information. Further, when the user of the electronic device 101 registers, in the geo-fence, the wireless LAN base station positioned in his home, it may be added to the wireless footprint information, and when the wireless LAN base station is positioned nearby, the electronic device 101 may automatically release the lock of the electronic device 101.

According to an embodiment of the present disclosure, in operation 916, the electronic device 101 may reflect the ratio determined in operation 914 in determining the position of the electronic device 101. The electronic device 101 may more precisely determine its position by reflecting the determined ratio to the position of the electronic device which has been determined in operation 618 of FIG. 6. The electronic device 101 may enhance reliability in determining the position of the electronic device 101 by reflecting the ratio determined in operation 912 in determining the position of the electronic device 101.

Figure 10:
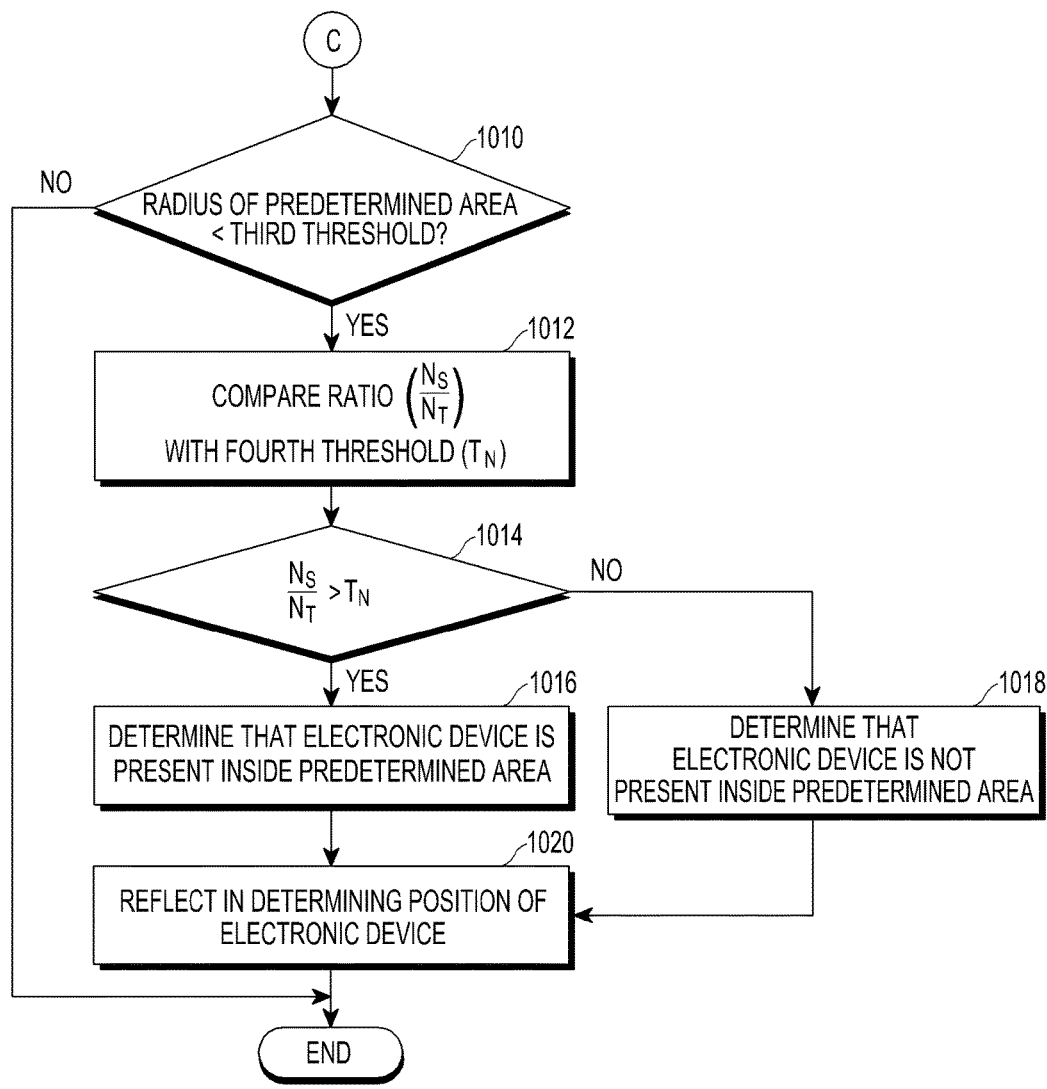
FIG. 10 is a flowchart illustrating an example process for determining a position of an electronic device when there is wireless footprint information according to an example embodiment.

FIG. 10 is a flowchart illustrating an example process for determining a position of an electronic device when there is wireless footprint information according to an example embodiment.

A process for determining a position of an electronic device when there is wireless footprint information according to an example embodiment is described below in greater detail with reference to FIG. 10. The operations of FIG. 10 may be performed after operation 620 of FIG. 6 or after operation 916 of FIG. 9.

According to an embodiment of the present disclosure, the electronic device 101 may reflect the ratio calculated in operation 1012 in determining the position of the electronic device 101. The electronic device 101 may more precisely determine its position by reflecting the determined ratio to the position of the electronic device which has been determined in operation 618 of FIG. 6.

According to an embodiment of the present disclosure, the electronic device 101 may compare the radius of a predetermined area with a third threshold in operation 1010.

When the radius of the predetermined area is too small to operate as a wireless LAN positioning-based geo-fence, the electronic device 101 may perform an additional geo-fencing operation. As such, to perform an additional geo-fencing operation, the electronic device 101 may compare the radius of the predetermined area with the third threshold.

According to an embodiment of the present disclosure, when the radius of the predetermined area is less than the third threshold, the electronic device 101 may compare the ratio $N_S/N_T$ with a fourth threshold $T_N$ in operation 1012. For example, when the radius r of the predetermined area is too small to perform a geo-fencing operation with a wireless LAN positioning-based geo-fence resolution, the electronic device 101 may compare the ratio $N_S/N_T$ with the fourth threshold $T_N$. In operation 1014, the electronic device 101 may determine whether the electronic device is present (or enters) inside the predetermined area or is not present inside (or exits) the predetermined area depending on a result of the comparison.

According to an embodiment of the present disclosure, when the ratio $N_S/N_T$ is larger than the fourth threshold $T_N$ in operation 1014, the electronic device 101 may determine that the electronic device 101 is present inside the predetermined area in operation 1016. If the ratio $N_S/N_T$ is greater than the fourth threshold $T_N$ in operation 1014, the electronic device 101 may determine that the electronic device 101 is not present inside the predetermined area in operation 1018.

According to an embodiment of the present disclosure, in operation 1020, the electronic device 101 may reflect the result determined in operations 1016 and 1018 in determining the position of the electronic device 101. For more accurately determining the position of the electronic device 101, the electronic device 101 may reflect the result determined in operations 1016 and 1018 to the position of the electronic device 101 which has been determined in operation 618 of FIG. 6. At least one of the operations described above in connection with FIG. 10 may be performed after operation 614 of FIG. 6 to determine the position of the electronic device 101.

Figure 11:
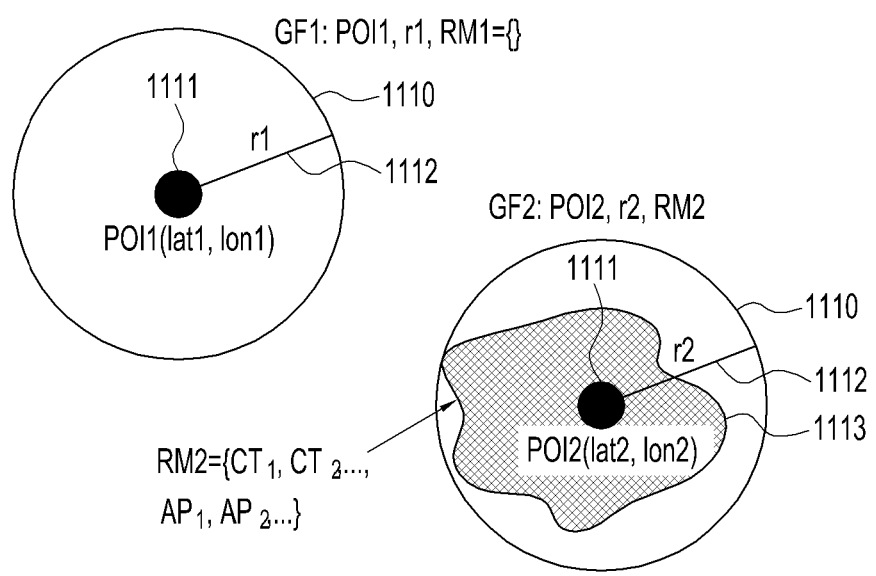
FIG. 11 is a diagram illustrating an example of a geo-fence according to an example embodiment.

FIG. 11 is a diagram illustrating an example of a geo-fence according to an example embodiment.

Referring to FIG. 11, the geo-fence according to the present disclosure may be a predetermined area whose radius is r. In the case of cellular-based positioning, the geo-fence 1110 may be shaped as a circle having radius 1112 from the center point 1111. The geo-fence may also include a wireless LAN footprint at the center point 1111. The area 1113 of the wireless LAN footprint may be a geographical area in which the user of the geo-fence has interest, such as topography, location, surroundings, shop in building, building itself, or central area of administrative district. The area 1113 of the wireless LAN footprint may be formed to be not only circular but in other various shapes, e.g., elliptical, as well. At least one cellular base station may be present inside the predetermined area, and/or at least one wireless LAN base station may be present inside the predetermined area. The geo-fence 1110 may be formed by a cellular base station. The wireless LAN footprint 1113 may be formed by directly receiving from the user of the electronic device 101 or may be formed as the electronic device 101 steadily monitors wireless signals from a wireless LAN base station. The electronic device 101 may receive wireless signals from at least one wireless LAN base station to derive central point candidates and provide the central point candidates to the user. The electronic device 101 may record variation information about an adjacent cellular base station and/or wireless LAN base station, along with a time, or may later analyze, e.g., camp-on time, visit frequency, or time to register the point with a high occupancy rate as a central point. The electronic device 101 may scan at least one wireless LAN base station, obtain information about the at least one wireless LAN base station, generate wireless footprint information, and store the wireless footprint information in the memory 130. The wireless footprint information may be received from the server 106. The wireless footprint information may include information about at least one cellular base station and information about at least one wireless LAN base station.

Figure 12A:
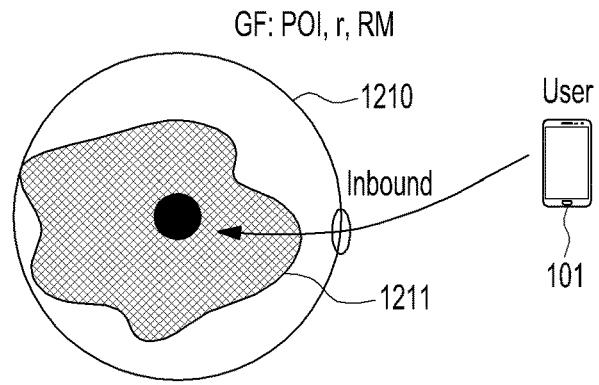
FIG. 12A is a diagram illustrating an example in which an electronic device enters a predetermined area according to an example embodiment.
Figure 12B:
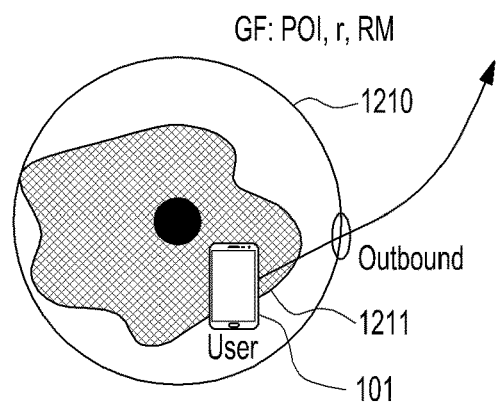
FIG. 12B is a diagram illustrating an example in which an electronic device exits a predetermined area according to an example embodiment.
Figure 12C:
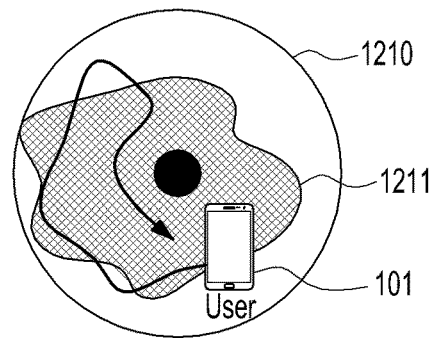
FIG. 12C is a diagram illustrating an example in which an electronic device camps on a predetermined area according to an example embodiment.

FIGS. 12A, 12B and 12C are diagrams illustrating examples of an entry, exit, or camp-on of an electronic device in a predetermined area according to various embodiments of the present disclosure. FIG. 12A is a diagram illustrating an example in which the electronic device 101 enters (or is present inside) a predetermined area according to an example embodiment of the present disclosure. FIG. 12B is a diagram illustrating an example in which the electronic device 101 exits (or is not present inside) a predetermined area according to an example embodiment of the present disclosure. FIG. 12C is a diagram illustrating an example in which the electronic device 101 camps on a predetermined area according to an example embodiment of the present disclosure.

Referring to FIGS. 12A to 12C, according to an example embodiment of the present disclosure, the electronic device 101 may receive a wireless signal from at least one cellular base station and/or at least one wireless LAN base station positioned nearby. The electronic device 101 may periodically monitor entry, exit, or camp-on in a predetermined area (e.g., a geo-fence) based on the received wireless signal. The electronic device 101 may periodically determine inbound detection for entry from the outside of the geo-fence 1210, outbound detection for exit to the outside of the geo-fence 1210, and dwelling detection for camping on inside the geo-fence 1210 for a predetermined time. For example, in the case of dwelling detection, the electronic device may measure the camp-on time at a level of each of cellular-based geo-fencing and wireless LAN-based geo-fencing according to the user's movement or scenario, thereby measuring the camp-on time.

Figure 13:
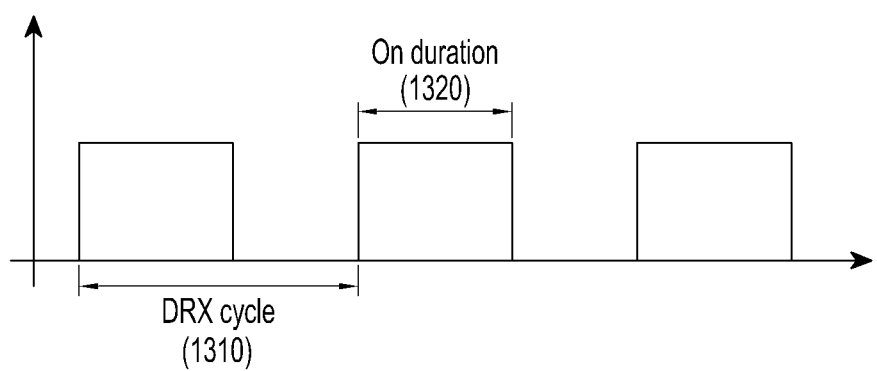
FIG. 13 is a diagram illustrating an example cycle at which an electronic device determines a position according to an example embodiment.

FIG. 13 is a diagram illustrating an example cycle at which an electronic device 101 determines its position according to an example embodiment of the present disclosure.

Referring to FIG. 13, according to an example embodiment of the present disclosure, the electronic device 101 may be operated as per the cycle 1310 at which the electronic device 101 communicates with a cellular base station. During the duration 1320 when the electronic device is activated in the cycle 1310, the electronic device may receive cellular data from the cellular base station and wireless LAN data from the wireless LAN base station to determine the position of the electronic device 101. The electronic device 101 may determine its position based on the received cellular data and the received wireless LAN data during the duration 1320 through the second processor (e.g., a CP). The electronic device 101 may perform geo-fencing at reduced power during the duration 1320 using the nature of the second processor 520 periodically waking up for communication with the base station. While the first processor 510 is in a sleep state, the electronic device 101 may communicate signals with at least one cellular base station and/or at least one wireless LAN base station through the second processor.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module as used herein may include, for example, and without limitation, at least one of a dedicated processor, a CPU, Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as commands stored in a computer-readable storage medium e.g., in the form of a programming module. When the commands are executed by a control circuit, the control circuit may perform functions corresponding to the commands. The computer-readable storage medium may be e.g., the memory 130. At least part of the programming module may be implemented (e.g., executed) by e.g., the control circuit. At least part of the programming module may include e.g., a module, program, routine, set of commands, process, or the like for performing one or more functions.

The computer-readable recording medium may include a magnetic medium, such as a hard disk, a floppy disk, and a magnetic tape, an optical recording medium, such as a compact disc-read only memory (CD-ROM) or digital video disc (DVD), a magnetic-optical medium, such as a floptical disc, and a hardware device specially configured to store and execute program commands (e.g., a programming module), such as a read only memory (ROM), random access memory (RAM), or flash memory. Examples of the program commands may include not only machine language codes but also high-level language codes which are executable by various computing means using an interpreter. The aforementioned hardware devices may be configured to operate as one or more software modules to carry out example embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). According to an embodiment of the present disclosure, there is provided a storage medium storing commands configured to be executed by at least one processor to enable the at least one processor to perform at least one operation and comprising a first command set for receiving cellular data from at least one cellular base station, a second command set for predicting a position of the electronic device based on the received cellular data, a third command set for receiving information about at least one wireless LAN base station, and a fourth command set for determining the position of the electronic device by reflecting the received information about the at least one wireless LAN base station to the predicted position.

As is apparent from the foregoing description, according to various example embodiments, cellular-based positioning and Wireless LAN-based positioning both are carried out, enabling an exact positioning of an electronic device. Further, such co-performing of cellular-based positioning and Wireless LAN-based positioning enables a determination as to whether the electronic device has approached or departed from an area of interest or camped on the area for a predetermined time.

According to various embodiments, it is possible to determine whether the electronic device has approached, departed from, or camped on an area of interest. In making such determination, the present disclosure may carry out the whole or part of cellular- or Wireless LAN-based positioning and efficiently obtain a database necessary for positioning.

According to various embodiments, when a first processor (e.g., an application processor (AP)) of the electronic device is periodically in a sleep state, a second processor (e.g., a communication processor (CP)) of the electronic device may determine the position of the electronic device through cellular data and Wireless LAN data, thereby reducing power consumption of the electronic device.

The various example embodiments illustrated herein are provided merely for better understanding of the present disclosure, and the present disclosure should not be limited thereto or thereby. It should be appreciated by one of ordinary skill in the art that various changes in form or detail may be made to the embodiments without departing from the scope of the present disclosure defined by the following claims and their equivalents.

What is claimed is:

1. An electronic device comprising:
a communication interface; and
a processor configured to:
control the communication interface to receive cellular data from at least one cellular base station,
obtain first information regarding a first position of the electronic device based on the received cellular data,
identify that the electronic device enters a predetermined area based on the first position of the electronic device obtained based on the received cellular data,
in response to identifying that the electronic device enters the predetermined area based on the first position obtained based on the received cellular data, control the communication interface to receive information about at least one wireless LAN base station,
obtain second information regarding a second position of the electronic device based on the received information about the at least one wireless LAN base station, and
identify that the electronic device enters the predetermined area based on the second position of the electronic device obtained based on the received information about the at least one wireless LAN base station.

2. The electronic device of claim 1, further comprising a memory configured to store a third information about at least one wireless LAN map, wherein a first wireless LAN map among the at least one wireless LAN map corresponds to an area identified based on the received cellular data.

3. The electronic device of claim 1, wherein the processor is configured to:
obtain a longitude and a latitude of the electronic device based on the received cellular data,
identify a probability value using a probability density function of the obtained longitude and latitude, and
identify that the electronic device enters the predetermined area by comparing the identified probability value with a first threshold.

4. The electronic device of claim 1, wherein the cellular data includes a cellular signal communicated between the electronic device and the at least one cellular base station and data related to the cellular base station.

5. The electronic device of claim 1, wherein the information about the at least one wireless LAN base station includes an identifier of the wireless LAN base station.

6. An electronic device comprising:
a communication interface; and
a processor configured to:
control the communication interface to receive cellular data from at least one cellular base station,
identify whether the electronic device is present inside a predetermined area based on a first position of the electronic device obtained based on the received cellular data,
based on identifying that the electronic device is present inside the predetermined area based on the first position obtained based on the received cellular data, control the communication interface to receive information about at least one wireless LAN base station,
obtain a second position of the electronic device based on information about at the least one wireless LAN base station;
wherein, as at least part of the identifying of whether the electronic device is present inside the predetermined area based on the first position obtained based on the received cellular data, the processor is configured to:
obtain a longitude and a latitude of the electronic device based on the received cellular data,
obtain a probability value using a probability density function of the obtained longitude and latitude,
identify that the electronic device is present inside the predetermined area when the identified probability value is greater than a first threshold, and
identify that the electronic device is not present inside the predetermined area unless the identified probability value is greater than the first threshold.

7. An electronic device comprising:
a communication interface; and
a processor configured to:
control the communication interface to receive cellular data from at least one cellular base station,
identify whether the electronic device is present inside a predetermined area based on a first position of the electronic device obtained based on the received cellular data,
based on identifying that the electronic device is present inside the predetermined area based on the first position obtained based on the received cellular data, control the communication interface to receive information about at least one wireless LAN base station,
identify a second position of the electronic device based on information about at the least one wireless LAN base station;
a memory configured to store at least one wireless LAN map, wherein a first wireless LAN map among the at least one wireless LAN map corresponds to an area positioned based on the received cellular data; and
wherein, as at least part of the identifying of the second position of the electronic device based on the information about the at least one wireless LAN base station, the processor is configured to:
obtain the information about the at least one wireless LAN base station by scanning surroundings of the electronic device, and
estimate the second position of the electronic device by comparing wireless LAN base station information included in the first wireless LAN map with the information about the wireless LAN base station obtained by the scanning.

8. The electronic device of claim 7, wherein the processor is configured to determine obtain a distance between a point of interest (POI) and the second position of the electronic device and to determine whether the electronic device is present inside the predetermined area by comparing the obtained distance with a radius of the predetermined area.

9. The electronic device of claim 8, wherein the processor is configured to identify that the electronic device is not present inside the predetermined area when the obtained distance is greater than the radius and to identify that the electronic device is present inside the predetermined area unless the obtained distance is greater than the radius.

10. The electronic device of claim 7, wherein the processor is configured to, when the memory includes wireless footprint information, obtain a ratio of the number of wireless LAN base stations included in the wireless footprint information of the scanned wireless LAN base stations to a total number of wireless LAN base stations included in the wireless footprint information and to reflect the obtained ratio in obtaining the second position of the electronic device.

11. The electronic device of claim 10, wherein the processor is configured to, when the radius of the predetermined area is less than a third threshold, compare the obtained ratio with a fourth threshold to identify whether the electronic device is present inside the predetermined area.

12. The electronic device of claim 11, wherein the processor is configured to, when the obtained ratio is greater than the fourth threshold, identify that the electronic device is present inside the predetermined area, and to reflect the obtaining of the second position of the electronic device.

13. The electronic device of claim 11, wherein the processor is configured to, when the obtained ratio is not greater than the fourth threshold, identify that the electronic device is not present inside the predetermined area and to reflect the obtaining of the second position of the electronic device.

14. A method for obtaining a position by an electronic device, the method comprising:
receiving cellular data from at least one cellular base station;
obtaining a first information regarding a first position of the electronic device based on the received cellular data;
identifying that the electronic device enters a predetermined area based on the first position of the electronic device obtained based on the received cellular data;
in response to identifying that the electronic device enters the predetermined area based on the first position obtained based on the received cellular data, receiving information about at least one wireless LAN base station; and
obtaining a second information regarding a second position of the electronic device based on the received information about the at least one wireless LAN base station; and
identifying that the electronic device enters the predetermined area based on the second position of the electronic device obtained based on the received information about the at least one wireless LAN base station.

15. The method of claim 14, wherein the method further comprises:
obtaining a longitude and a latitude of the electronic device based on the received cellular data,
obtaining a probability value using a probability density function of the obtained longitude and latitude, and
identifying that the electronic device enters the predetermined area by comparing the obtained probability value with a first threshold.

16. A method for obtaining a position by an electronic device, the method comprising:
receiving cellular data from at least one cellular base station;
identifying whether the electronic device is present inside a predetermined area based on a first position of the electronic device obtained based on the received cellular data;
based on identifying that the electronic device is present inside the predetermined area based on the first position obtained based on the received cellular data, receiving information about at least one wireless LAN base station; and
obtaining a second position of the electronic device based on the received information about the at least one wireless LAN base station and the obtained position,
wherein the identifying of whether the electronic device is present inside the predetermined area based on the first position obtained based on the received cellular data comprises:
obtaining a longitude and a latitude of the electronic device based on the received cellular data,
obtaining a probability value using a probability density function of the obtained longitude and latitude,
when the obtained probability value is greater than the first threshold, identifying that the electronic device is present inside the predetermined area, and
when the obtained probability value is not greater than the first threshold, identifying that the electronic device is not present inside the predetermined area.

17. A method for obtaining a position by an electronic device, the method comprising:
receiving cellular data from at least one cellular base station;
identifying whether the electronic device is present inside a predetermined area based on a first position of the electronic device obtained based on the received cellular data;
receiving information about at least one wireless LAN base station;
obtaining a second position of the electronic device based on the received information about the at least one wireless LAN base station and the obtained position; and
wherein the obtaining of the second position of the electronic device based on the information about the at least one wireless LAN base station comprises:
obtaining the information about the at least one wireless LAN base station by scanning surroundings of the electronic device, and
estimating the second position of the electronic device by comparing wireless LAN base station information included in a first wireless LAN map corresponding to an area positioned based on the received cellular data among at least one wireless LAN map stored in a memory of the electronic device with the information about the wireless LAN base station obtained by the scanning.

18. The method of claim 17, wherein the obtaining of the second position of the electronic device comprises obtaining a distance between a point of interest (POI) and the estimated position of the electronic device and identifying whether the electronic device is present inside the predetermined area by comparing the obtained distance with a radius of the predetermined area.

19. The method of claim 17, wherein the obtaining of the second position of the electronic device includes, when the memory comprises wireless footprint information, obtaining a ratio of the number of wireless LAN base stations included in the wireless footprint information of the scanned wireless LAN base stations to a total number of wireless LAN base stations included in the wireless footprint information and reflecting the obtained ratio in the obtaining of the second position of the electronic device.

20. A non-transitory computer-readable storage medium storing a program including at least one command which, when executed by a processor of an electronic device, causes the processor to perform the method of claim 17.

* * * * *